US008830304B2

(12) United States Patent
Miyatani et al.

(10) Patent No.: US 8,830,304 B2
(45) Date of Patent: Sep. 9, 2014

(54) INFORMATION PROCESSING APPARATUS AND CALIBRATION PROCESSING METHOD

(75) Inventors: Sonoko Miyatani, Kawasaki (JP); Kenji Morita, Yokohama (JP); Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 12/764,591

(22) Filed: Apr. 21, 2010

(65) Prior Publication Data

US 2010/0295924 A1 Nov. 25, 2010

(30) Foreign Application Priority Data

May 21, 2009 (JP) ................................. 2009-123533

(51) Int. Cl.
H04N 13/02 (2006.01)
H04N 13/04 (2006.01)

(52) U.S. Cl.
CPC ......... *H04N 13/0239* (2013.01); *H04N 13/044* (2013.01); *H04N 13/0278* (2013.01)
USPC .................... 348/47; 348/51; 348/53; 348/94; 348/115

(58) Field of Classification Search
CPC .............. G01B 11/22; H04N 13/0429; H04N 13/0239; H04N 13/0431; G06T 7/002; G06T 7/0022
USPC ................................. 382/100–300; 348/42–60
See application file for complete search history.

(56) References Cited

U.S. PATENT DOCUMENTS 7,053,916 B2    5/2006  Kobayashi et al.
7,301,648 B2 * 11/2007  Foxlin .......................... 356/620
7,397,930 B2 *  7/2008  Uchiyama et al. ............ 382/103

(Continued)

FOREIGN PATENT DOCUMENTS

JP    2000-268179 A    9/2000
JP    2002-159019 A    5/2002
JP    2005-017286 A    1/2005

OTHER PUBLICATIONS

Kanabara, M. and Yokoya, N. and Takemura, H. "Registration for Stereo Vision-based Augmented Reality Based on Extendible Tracking of Markers and Natural Features" Dec. 10, 2002. 16th International Conference on Pattern Recognition, 2002. IEEE Proceedings. vol. 2: p. 1045-1048.*

(Continued)

Primary Examiner — Sath V Perungavoor
Assistant Examiner — Matthew J Anderson
(74) Attorney, Agent, or Firm — Fitzpatrick, Cella, Harper & Scinto

(57) ABSTRACT

An information processing apparatus, which provides images for stereoscopic viewing by synthesizing images obtained by capturing an image of real space by a main image sensing device and sub image sensing device to a virtual image, measures the position and orientation of the main image sensing device, calculates the position and orientation of the sub image sensing device based on inter-image capturing device position and orientation held in a holding unit and the measured position and orientation of the main image sensing device. Then the information processing apparatus calculates an error using the measured position and orientation of the main image sensing device, the calculated position and orientation of the sub image sensing device, and held intrinsic parameters of the main image sensing device and sub image sensing device. The information processing apparatus calibrates the held information based on the calculated error.

16 Claims, 16 Drawing Sheets

(56) References Cited

U.S. PATENT DOCUMENTS

| | | |
|---|---|---|
| 7,420,556 B2 | 9/2008 | Fujiki |
| 7,423,666 B2 * | 9/2008 | Sakakibara et al. ......... 348/136 |
| 7,454,065 B2 * | 11/2008 | Satoh ........................... 382/190 |
| 7,519,218 B2 * | 4/2009 | Takemoto et al. ............ 382/165 |
| 7,558,689 B2 * | 7/2009 | Anabuki et al. ................. 702/94 |
| 7,583,372 B2 * | 9/2009 | Shylanski et al. ....... 356/139.09 |
| 7,627,137 B2 * | 12/2009 | Takemoto .................... 382/103 |
| 7,698,094 B2 * | 4/2010 | Aratani et al. ................ 702/150 |
| 7,728,852 B2 | 6/2010 | Suzuki et al. |
| 7,760,242 B2 * | 7/2010 | Anabuki .................... 348/222.1 |
| 7,817,167 B2 * | 10/2010 | Suzuki et al. ................ 345/633 |
| 7,834,909 B2 * | 11/2010 | Katano et al. ........... 348/208.99 |
| 7,974,462 B2 * | 7/2011 | Takemoto et al. ............ 382/154 |
| 8,120,644 B2 * | 2/2012 | Chen .............................. 348/46 |
| 8,593,524 B2 * | 11/2013 | Kleihorst ..................... 348/175 |
| 8,610,761 B2 * | 12/2013 | Haisty et al. ................... 348/51 |
| 2002/0030675 A1 * | 3/2002 | Kawai .......................... 345/204 |
| 2005/0237385 A1 * | 10/2005 | Kosaka et al. .................. 348/42 |
| 2006/0018509 A1 * | 1/2006 | Miyoshi et al. ............... 382/104 |
| 2006/0244820 A1 | 11/2006 | Morita et al. |
| 2007/0006091 A1 | 1/2007 | Sakagawa et al. |
| 2007/0242086 A1 * | 10/2007 | Tsujimoto et al. ............ 345/632 |
| 2007/0242899 A1 | 10/2007 | Satoh et al. |
| 2007/0258658 A1 * | 11/2007 | Kobayashi et al. ........... 382/276 |
| 2009/0167843 A1 * | 7/2009 | Izzat et al. ...................... 348/43 |

OTHER PUBLICATIONS

Tsai, Roger. "A Versatile Camera Calibration Technique for High-Accuracy 3D Machine Vision Metrology using Off-the-shelf TV Cameras and Lenses" (Aug. 1987) IEEE Journal of Robotics and Automation, vol. RA-3, No. 4.*

D. Kotake et al., "A Marker Calibration Method Utilizing a Priori Knowledge on Marker Arrangement," Journal of VRSJ, vol. 10, No. 3, p. 401-410 (2005).

* cited by examiner

FIG. 16A
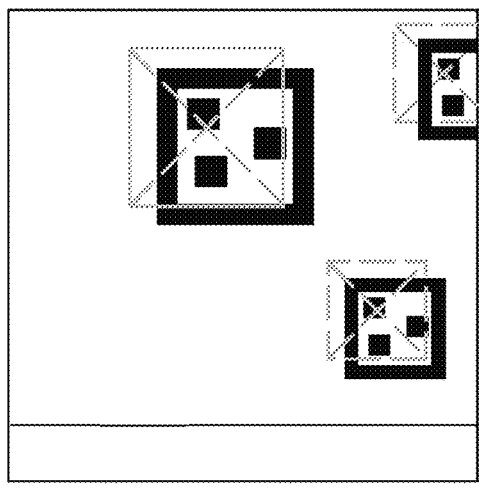
SYNTHESIZED IMAGE OF
MAIN INFORMATION
PROCESSING APPARATUS
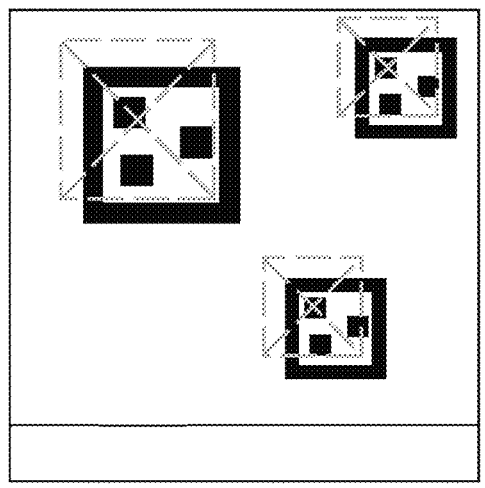
SYNTHESIZED IMAGE OF
SUB INFORMATION
PROCESSING APPARATUS
FIG. 16B
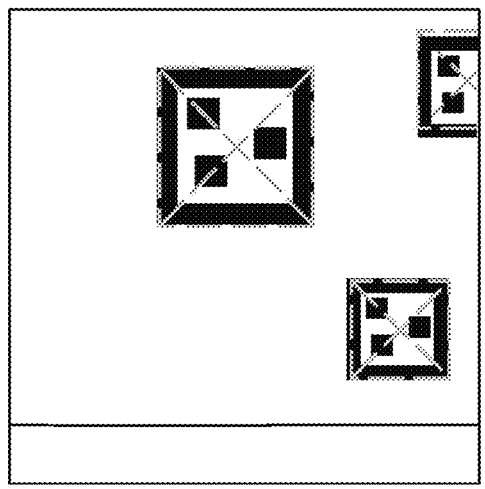
SYNTHESIZED IMAGE OF
MAIN INFORMATION
PROCESSING APPARATUS
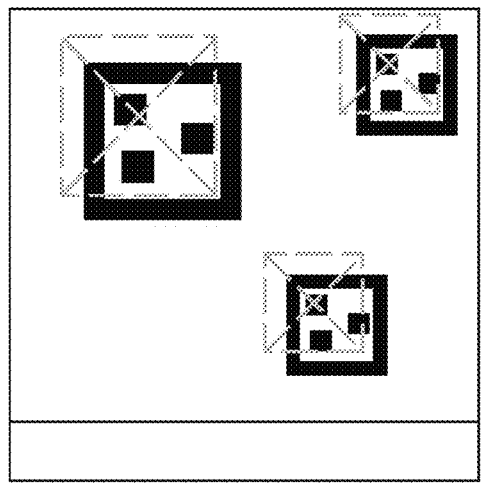
SYNTHESIZED IMAGE OF
SUB INFORMATION
PROCESSING APPARATUS

INFORMATION PROCESSING APPARATUS AND CALIBRATION PROCESSING METHOD

BACKGROUND OF THE INVENTION

1. Field of the Invention

The present invention relates to a calibration technique of camera intrinsic parameters and a relative position and orientation between cameras.

2. Description of the Related Art

Conventionally, a virtual reality (VR) system is known. This VR system presents a three-dimensional computer graphics (CG) image created by a computer to the user to make him or her feel as if a virtual space were a real space. In recent years, a technique for presenting information which does not exist in real space to the user by synthesizing a three-dimensional CG to an image of real space has been developed. This technique is called a mixed reality (MR) system. This MR system aims at coexistence of the for a real space and a virtual space to coexist that can be experienced in only a condition isolated from the real space, and has received a lot of attention as a technique for enhancing virtual space.

As a typical apparatus that implements the aforementioned system (VR system/MR system), which allows the virtual space and real space to coexist, a head-mounted display (HMD) is available. The VR/MR system can present the virtual space and MR space to the user who wears the HMD by displaying the virtual space and real space on the HMD (see Japanese Patent Laid-Open No. 2002-159019). As an apparatus of this type, a stereo video see-through HMD (to be simply referred to as an HMD hereinafter) is used. The HMD has an outer appearance shape similar to spectacles or goggles, and right- and left-eye display devices including, for example LCDs are arranged inside the HMD. When a stereo video image is to be acquired by video cameras mounted on the HMD, right- and left-eye stereo video cameras are arranged at, for example, positions adjacent to the right and left viewpoint positions of the user (who wears the HMD).

In order to provide high-quality MR, accurate registration is required between the real space and virtual space. In the case of the aforementioned system using the HMD, the positions and orientations of both the right- and left-eye stereo video cameras on the real space are calculated, and three-dimensional CGs are rendered based on the respective positions and orientations and are synthesized to an image of real space. The positions and orientations of the cameras may be calculated from the values of sensors such as magnetic or optical sensors to the cameras. However, the relative position and orientation between the two cameras may often fail to be constant due to errors of the sensors, thus making the user feel unnatural. As a method of avoiding such unnaturalness, a method of using the relative position and orientation between the two cameras, which are calculated in advance, is effective. With this method, one of the right- and left-eye stereo video cameras is set as a main camera, and the other is set as a sub camera. Then, a sensor is attached to only the main camera to calculate the position and orientation, and the position and orientation of the sub camera are calculated using the position and orientation calculated using the sensor, and the relative position and orientation between the two cameras, which are calculated in advance.

Not only in the system using the HMD, camera intrinsic parameters have to be taken into consideration so as to attain accurate registration. The intrinsic parameters include, for example, a focal length, principal point position, and lens distortion. As for calculations of the intrinsic parameters, a method using a calibration pattern (see Japanese Patent Laid-Open No. 2005-017286), a method calculating the intrinsic parameters from a moving image (see Japanese Patent Laid-Open No. 2000-268179), and the like are known.

The aforementioned position and orientation between the two cameras and the camera intrinsic parameters are unique to each HMD. However, the camera intrinsic parameters and the relative position and orientation between the two cameras often change when the HMD is inadvertently dropped or due to arbitrary external factors. In such a case, they have to be calculated again. However, the user may continue to use the HMD depending on his or her knowledge or experience level with respect to the HMD or MR technology. When the user continues a job while wearing the HMD in such state, a normal stereoscopic viewing disturbance may adversely affect the body of the user.

SUMMARY OF THE INVENTION

The present invention has been made in consideration of the aforementioned problems, and one preferred embodiment of the present invention provides an information processing apparatus and calibration processing method which can prevent display of a VR space from adversely affecting the body of a viewer when the camera intrinsic parameters and the relative position and orientation between cameras have changed.

According to one aspect of the present invention, there is provided an information processing apparatus, which provides images for stereoscopic viewing by synthesizing images, obtained by capturing an image of a real space by a stereoscopic viewing apparatus that mounts both a first image capturing device and a second image capturing device, with a virtual image, the apparatus comprising: a position and orientation measurement unit which measures a position and orientation of the first image capturing device; a first acquisition unit which acquires a first captured image obtained by capturing an index on the real space by the first image capturing device; a first index detection unit which detects the index from the first captured image; a calculation unit which calculates a projected index which may be included in an image captured from the second image capturing device, based on inter-device position and orientation information that indicates a position and orientation relationship between the first image capturing device and the second image capturing device and is held in a holding unit, intrinsic parameters of the first and second image capturing devices that are held in the holding unit, the position and orientation of the first image capturing device measured by the position and orientation measurement unit, and the index detected by the first index detection unit; a second acquisition unit which acquires a second captured image obtained by capturing an index on the real space by the second image capturing device; a second index detection unit which detects the index from the second captured image; a judgment unit which judges based on the projected index and the index detected by the second index detection unit whether or not an error is included in at least one of pieces of calibration target information including the inter-device position and orientation information held in the holding unit, the intrinsic parameter of the first image capturing device, and the intrinsic parameter of the second image capturing device; a calibration target measurement unit which measures, when the judgment unit judges that an error is included in one of the pieces of calibration target information, that calibration target information; a determination unit which determines an error to be calibrated of the calibration target information by comparing the calibration target information held in the holding unit and calibration target information measured by the calibration target information measurement unit; and a calibration unit which calibrates the calibration target information held in the holding unit, based on a determination result of the determination unit.

Further features of the present invention will become apparent from the following description of exemplary embodiments with reference to the attached drawings.

BRIEF DESCRIPTION OF THE DRAWINGS

FIGS. 16A and 16B are views showing an example of a synthesized image according to the third embodiment.

DESCRIPTION OF THE EMBODIMENTS

First Embodiment

Figure 1A:
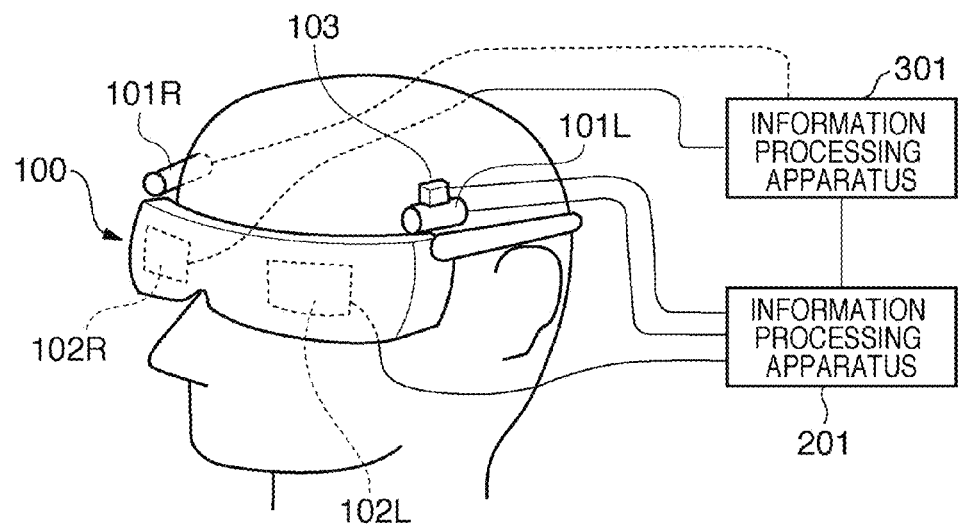
FIGS. 1A and 1B are respectively a view and block diagram for explaining a system using a stereo video see-through HMD.

FIG. 1A is a view illustrating a state when the user wears a stereo video see-through HMD 100 (to be simply referred to as an HMD 100 hereinafter). The HMD 100 has an outer appearance shape similar to spectacles or goggles, and right- and left-eye display units 102R and 102L including, for example LCDs are arranged inside the HMD. In order to acquire a stereo video image, a main image capturing device 101L as a first image capturing device which serves as a left-eye video camera is arranged in the vicinity of the left-eye viewpoint position of the user (who wears the HMD) in the HMD 100. Likewise, a sub image capturing device 101R as a second image capturing device which serves as a right-eye video camera is arranged in the vicinity of the right-eye viewpoint position of the HMD 100. The main image capturing device 101L and sub image capturing device 101R include, for example, CCD cameras, and capture images of a real world. A position and orientation sensor 103 is used to detect the position and orientation of the main image capturing device 101L, and includes, for example, a gyro sensor and magnetic sensor. A system of this embodiment includes an information processing apparatus 201 which is connected to the main image capturing device 101L, display unit 102L, and position and orientation sensor 103, and an information processing apparatus 301 which is connected to the sub image capturing device 101R and display unit 102R. Note that the left image capturing device will be referred to as a main image capturing device and the right image capturing device will be referred to as a sub image capturing device hereinafter. However, the main/sub relationship is not limited to this, and the right and left devices may respectively serve as main and sub devices.

Figure 2:
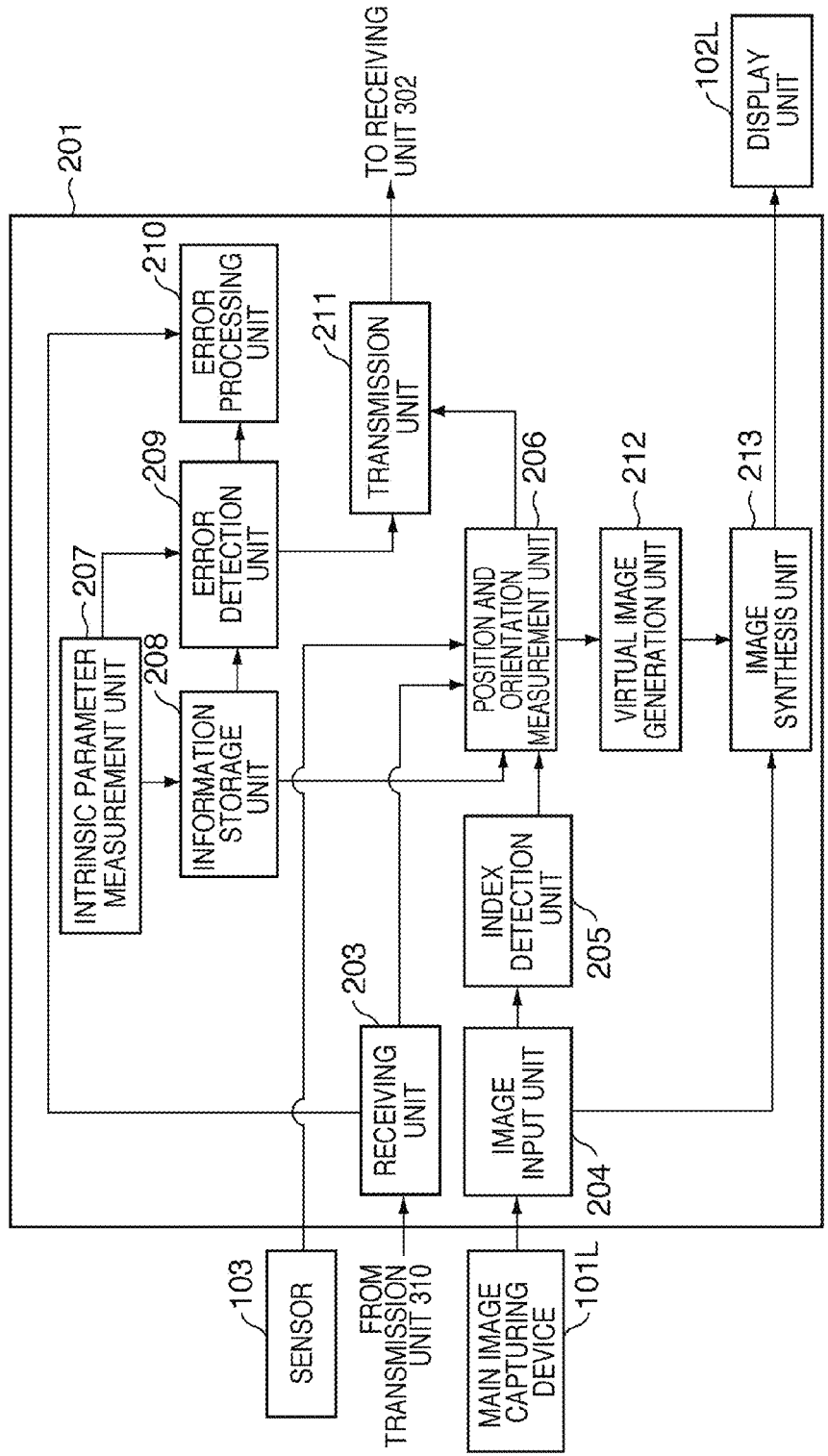
FIG. 2 is a block diagram of a main information processing apparatus according to the first and second embodiments.
Figure 3:
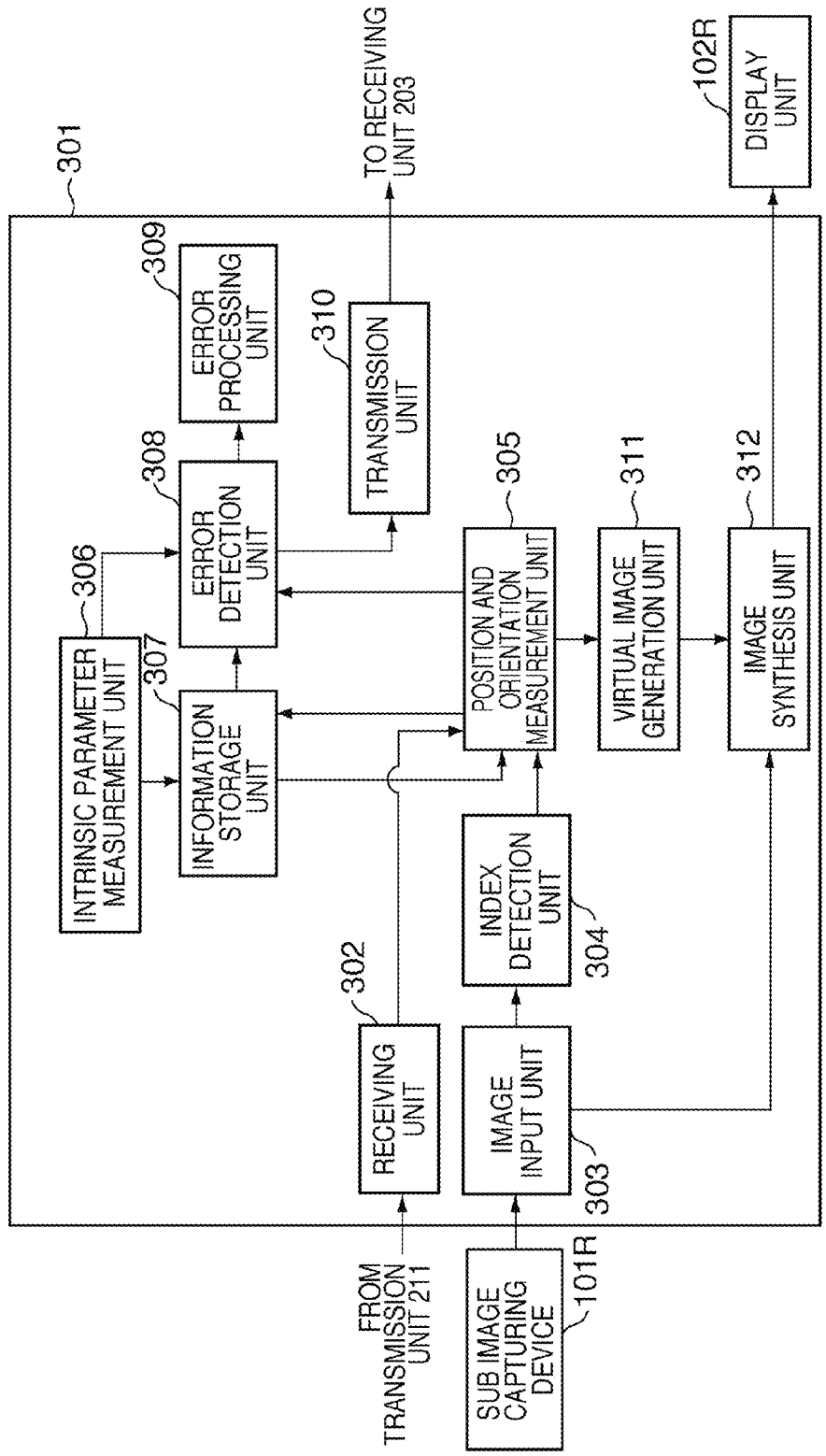
FIG. 3 is a block diagram of a sub information processing apparatus according to the first and second embodiments.

FIGS. 2 and 3 are block diagrams showing the functional arrangements of the information processing apparatuses 201 and 301, respectively. For the sake of descriptive convenience, the information processing apparatus connected to the main image capturing device 101L will be referred to as a main information processing apparatus 201, and the information processing apparatus 301 connected to the sub image capturing device 101R will be referred to as a sub information processing apparatus 301.

In the main information processing apparatus 201, a receiving unit 203 externally receives information. In this embodiment, the receiving unit 203 receives an error detection condition and the like from the sub information processing apparatus 301. The received error detection condition is supplied to an error processing unit 210.

An image input unit 204 inputs an image captured by the main image capturing device 101L.

An index detection unit 205 detects indices from the image input by the image input unit 204. Note that the indices include, for example, artificial markers which define information such as colors, shapes, IDs, or sizes, and natural features available in a real world.

Figure 4:
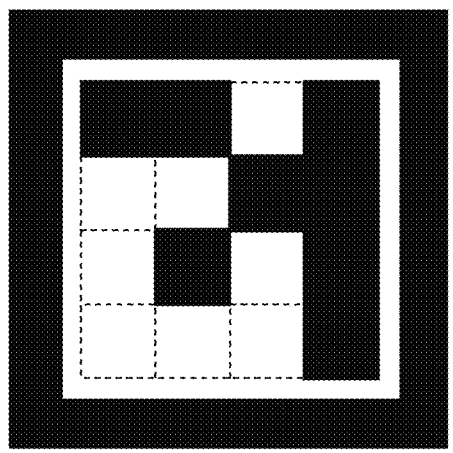
FIG. 4 is a view showing an example of an artificial marker.

FIG. 4 shows an example of an artificial marker that can be used as an index. The interior of the marker shown in FIG. 4 is configured by 4×4 small squares, each of which is painted in one of black and white. The painted color represents a bit value "0" or "1", and a combination of these bit values defines a unique ID and a physical size of the artificial marker. Information of each detected index is supplied to a position and orientation measurement unit 206.

The position and orientation measurement unit 206 calculates a relative position and orientation between the indices detected by the index detection unit 205 and the main image capturing device 101L, and also the position and orientation of the main image capturing device 101L based on index definition information held in an information storage unit 208 or values output from the position and orientation sensor 103.

An intrinsic parameter measurement unit 207 measures intrinsic parameters of the main image capturing device 101L. The measurement result is supplied to the information storage unit 208 or an error detection unit 209.

The information storage unit 208 holds index definition information which defines the position and orientation of each index on the real space, and the intrinsic parameters of the main image capturing device 101L. The index definition information and intrinsic parameters have to be calculated in advance. As a method of calculating the index definition information, a method of calibrating a relative position and orientation between indices from an image obtained by capturing images of indices has been proposed (Kotake, Uchiyama, and Yamamoto: A Marker Calibration Method Utilizing A Priori Knowledge on Marker Arrangement, the Journal of VRSJ, vol. 10, No. 3, pp. 401-410, 2005). The intrinsic parameters mean, for example, a focal length, principal point position, and distortion of an image capturing device. Such intrinsic parameters are calculated using a plurality of captured images including indices and a given method (for example introduction of an epipolar equation).

The error detection unit 209 detects deviations between the actual intrinsic parameters measured by the intrinsic parameter measurement unit 207 and intrinsic parameters which are stored in the information storage unit 208 and are being applied, thus detecting occurrence of errors. The detection result of the error detection unit 209 is supplied to the error processing unit 210 and a transmission unit 211.

The error processing unit 210 decides and execute calibration processing based on the deviation information sent from the error detection unit 209 and the error detection condition of the sub information processing apparatus 301, which is received by the receiving unit 203.

The transmission unit 211 externally transmits information. In this embodiment, the transmission unit 211 transmits the position and orientation of the main image capturing device 101L calculated by the position and orientation measurement unit 206, the error detection condition of the error detection unit 209, and the like to the sub information processing apparatus 301.

A virtual image generation unit 212 generates a virtual image (CG) to have, as a viewpoint, the position and orientation of the main image capturing device 101L measured by the position and orientation measurement unit 206.

An image synthesis unit 213 generates a synthesized image by synthesizing the image input by the image input unit 204 and the virtual image generated by the virtual image generation unit 212, and transmits the synthesized image to the display unit 102L. The display unit 102L displays the synthesized image.

The sub information processing apparatus 301 will be described below with reference to FIG. 3.

The sub image capturing device 101R captures an image of the real world in the same manner as the main image capturing device 101L.

A receiving unit 302 externally receives information. In this embodiment, the receiving unit 302 receives the position and orientation of the main image capturing device 101L, the error detection condition detected by the error detection unit 209, and the like, which are transmitted from the transmission unit 211 of the main information processing apparatus 201. The position and orientation and the error detection condition are supplied to the position and orientation measurement unit 305.

An image input unit 303 inputs an image captured by the sub image capturing device 101R.

An index detection unit 304 detects indices (for example, an artificial marker shown in FIG. 4) from the image input by the image input unit 303. Information of each detected index is supplied to the position and orientation measurement unit 305.

The position and orientation measurement unit 305 calculates the position and orientation of the sub image capturing device 101R based on a position and orientation between image capturing devices already stored in an information storage unit 307 (inter-device position and orientation information), and the position and orientation of the main image capturing device 101L, which are received by the receiving unit 302. The position and orientation measurement unit 305 calculates a relative position and orientation between the indices detected by the index detection unit 304 and the sub image capturing device 101R, and also calculates the position and orientation between the image sensing devices based on those of the main image capturing device 101L, which are received by the receiving unit 302, as needed. These calculation results are supplied to the information storage unit 307, an error detection unit 308, and a virtual image generation unit 311.

An intrinsic parameter measurement unit 306 measures the intrinsic parameters of the sub image capturing device 101R. The measurement result is supplied to the information storage unit 307 and error detection unit 308.

The information storage unit 307 stores index definition information which defines positions and orientations of indices on the real space, the intrinsic parameters, and the position and orientation between the image capturing devices (inter-device position and orientation information). Note that the definition information has to be generated in advance by the same method as that described above in the information storage unit 208.

The error detection unit 308 calculates deviations between the intrinsic parameters or inter-image capturing device position and orientation sent from the intrinsic parameter measurement unit 306 or position and orientation measurement unit 305, and the intrinsic parameters which are held by the information storage unit 307 and are being applied or the values of the inter-image capturing device position and orientation. Then, the error detection unit 308 then determines based on the deviations if errors have occurred. The judgment result of the error detection unit 308 is supplied to an error processing unit 309 and transmission unit 310.

The error processing unit 309 decides calibration processing to be executed based on the deviation information sent from the error detection unit 308 and the error detection condition of the main information processing apparatus 201 received by the receiving unit 302, and executes the decided calibration processing.

The transmission unit 310 externally transmits information. In this embodiment, the transmission unit 310 transmits an error detection condition and the like to the main information processing apparatus 201.

A virtual image generation unit 311 generates a virtual image (CG) to have, as a viewpoint, the position and orientation of the sub image capturing device 101R measured by the position and orientation measurement unit 305.

An image synthesis unit 312 generates a synthesized image by synthesizing the image input by the image input unit 303 and the virtual image generated by the virtual image generation unit 311, and transmits the synthesized image to the display unit 102R. The display unit 102R displays the synthesized image.

In FIGS. 2 and 3, the main image capturing device 101L and sub image capturing device 101R are connected to a single information processing apparatus. In case of the arrangement in which these image capturing devices are connected to a single information processing apparatus, that information processing apparatus has both the functions of the main information processing apparatus 201 and sub information processing apparatus 301. The positions and orientations, error detection conditions, and the like may be shared using an information storage unit in place of being exchanged. The main image capturing device 101L and sub image capturing device 101R may be identified using identification information such as device names or by connection terminals.

Figure 1B:
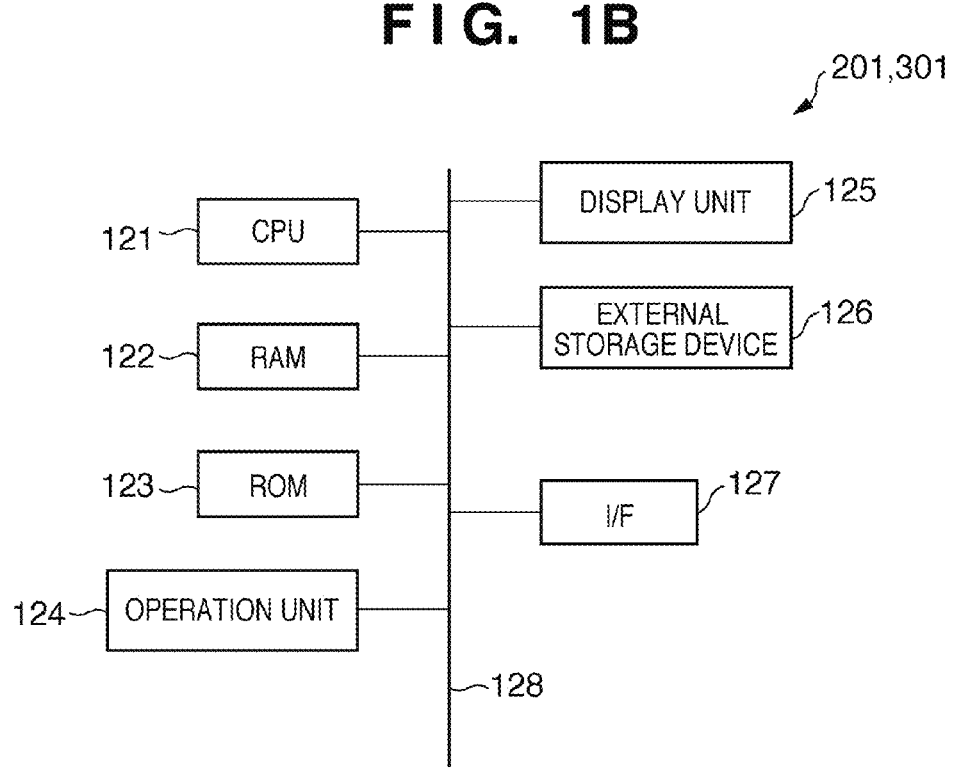

FIG. 1B is a block diagram showing an example of the hardware arrangement of a computer which is applicable to the aforementioned information processing apparatuses 201 and 301. Referring to FIG. 1B, a CPU 121 controls the overall computer using programs and data stored in a RAM 122 and ROM 123, and executes respective processes to be described later as those to be implemented by this computer. The RAM 122 has an area used to temporarily store programs and data loaded from an external storage device 126. Also, the RAM 122 has an area used to temporarily store data (the position and orientation of the image capturing device and the error detection condition in this embodiment) acquired from an external device (the image capturing device in this embodiment) via an I/F (interface) 127. Furthermore, the RAM 122 has a work area used when the CPU 121 executes various processes. In this way, the RAM 122 can provide areas as various usages as needed. The ROM 123 stores setting data, a boot program, and the like of the computer.

An operation unit 124 includes a keyboard and mouse. When the operator of the computer operates the operation unit 124, the operation unit 124 can input various instructions to the CPU 121. A display unit 125 includes a CRT or liquid crystal display, and can display the processing result of the CPU 121 by means of images and characters. In this embodiment, the display unit 125 may be substituted by the display units 102L and 102R shown in FIGS. 2 and 3.

The external storage device 126 is a large-capacity information storage device represented by a hard disk drive. The external storage device 126 stores an OS (Operating System), various kinds of information (data) to be held by the RAM 122, and programs and data for making the CPU 121 execute respective processes to be described later as those which are implemented by the computer. The programs include computer programs required to implement stereoscopic viewing. The computer programs required to implement stereoscopic viewing, for example, include:

a program for calculating the positions and orientations of the main image capturing device 101L and sub image capturing device 101R;

a program for calculating intrinsic parameters and inter-image capturing device parameters;

a program for executing error detection and processing after the error detection; and a program for rendering a CG using values calculated by the programs.

These computer programs and data are loaded from a computer-readable storage medium onto the RAM 122 as needed under the control of the CPU 121. Then, the CPU 121 executes processes using the loaded programs and data. When the main image capturing device 101L and sub image capturing device 101R are connected to a single information processing apparatus, pieces of information such as position and orientation information and error detection conditions are shared via this external storage device 126. As described above, respective operations to be described later are implemented when the CPU 121 executes programs stored in a computer-readable storage medium such as a CD-ROM, DVD, or flash memory.

The I/F 127 serves as an interface required to connect the image capturing device to the information processing apparatus and that required to connect an external network. For example, images captured by the image capturing devices 101L and 101R are input to the RAM 122 and external storage device 126 of this computer via the I/F 127. When the main image capturing device 101L and sub image capturing device 101R are connected to the different information processing apparatuses 201 and 301, pieces of information such as position and orientation information and error detection conditions are exchanged via this I/F 127. Also, signals required to drive the display units 102L and 102R are transmitted via the I/F 127. Reference numeral 128 denotes a bus which interconnects the aforementioned units.

Note that the hardware arrangement of the computer applicable to the information processing apparatuses 201 and 301 according to this embodiment is not limited to the arrangement shown in FIG. 1B. For example, various other arrangements may be used as long as respective processes (to be described later) to be executed by the information processing apparatuses 201 and 301 can be implemented.

Figure 5:
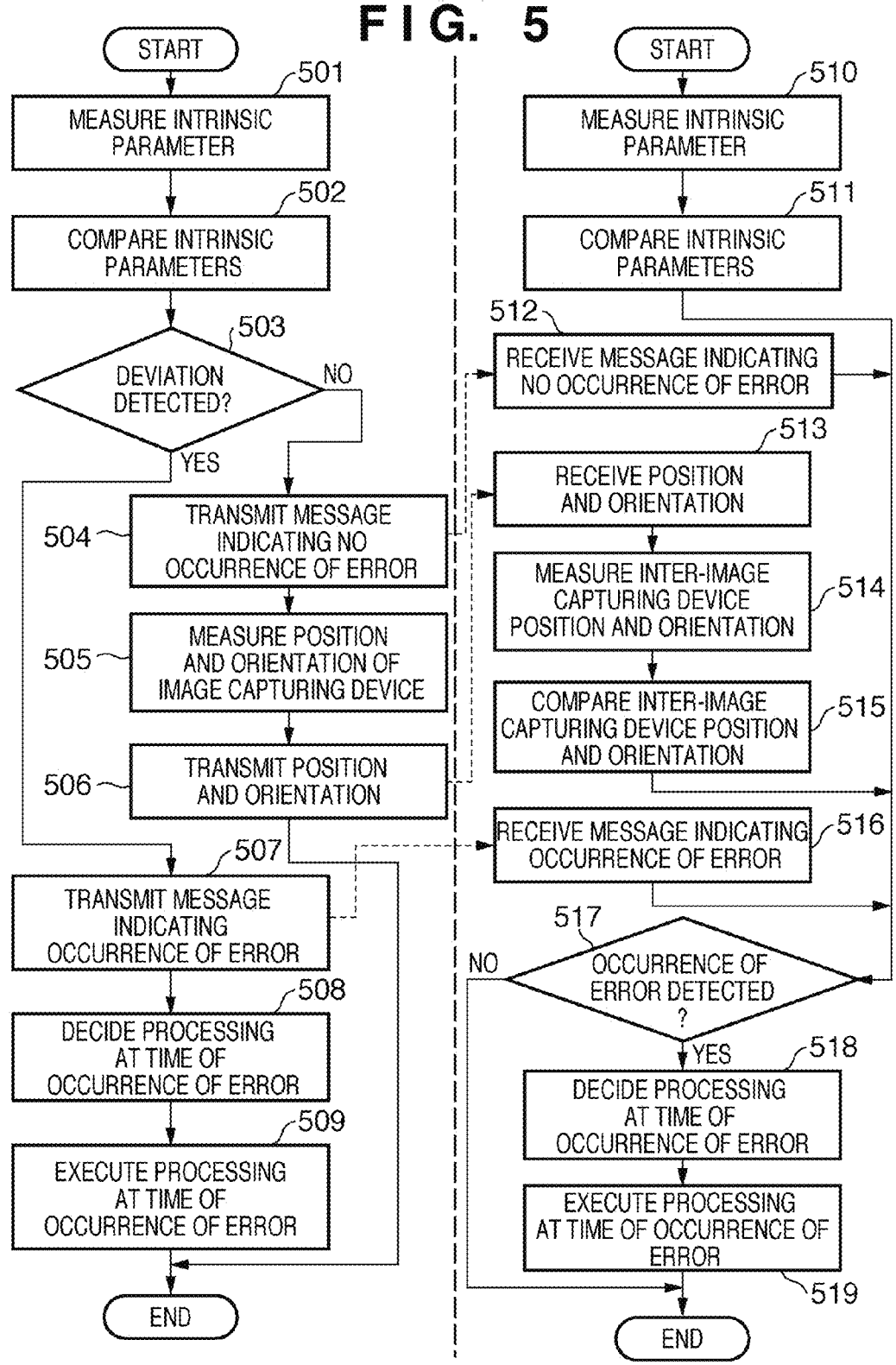
FIG. 5 is a flowchart for explaining processing of the main information processing apparatus by a system according to the first embodiment.

FIG. 5 is a flowchart for explaining processing of the main information processing apparatus by the system of this embodiment. The processing for preventing any adverse influence on a viewer when the intrinsic parameters of the image capturing devices and the relative position and orientation between the image capturing devices have changed in the system of this embodiment with the aforementioned arrangement will be described below with reference to the flowchart shown in FIG. 5. In FIG. 5, the flowchart on the left side of the vertical dotted line indicates the processing sequence of the main information processing apparatus 201, and that on the right side indicates the processing sequence of the sub information processing apparatus 301. The processing to be described below determines validity of pieces of information (intrinsic parameters and inter-device position and orientation information) held in the information storage units 208 and 307, and executes calibration processing when it is judged that these pieces of information are not valid. Assume that the processing to be described below is executed at the startup timing of the apparatuses. Of course, the processing to be described below may be executed at the time of manufacture or repetitively at time intervals set by the user.

The processing of the main information processing apparatus 201 will be described first.

In step 501, the intrinsic parameter measurement unit 207 measures intrinsic parameters using an image captured by the main image capturing device 101L.

In step 502, the error detection unit 209 compares the intrinsic parameter values (actual values) measured in step 501 and intrinsic parameter values which are stored in the information storage unit 208 and are currently being applied. The unit 209 calculates a difference between these intrinsic parameters. If the difference exceeds a predetermined value, the unit 209 judges that these parameters have deviations.

In step 503, as a result of comparison in step 502, if no deviations between the intrinsic parameters are detected, the process advances to step 504.

In step 504, the error detection unit 209 transmits a message indicating that no errors occur to the sub information processing apparatus 301 via the transmission unit 211.

In step 505, the position and orientation measurement unit 206 measures the position and orientation of the main image capturing device 101L. As a position and orientation measurement method, a relative position and orientation between a given index detected by the index detection unit 205 and the main image capturing device 101L may be calculated based on the position of that index on the image and the size of the index itself appended to the index.

In step 506, the position and orientation measurement unit 206 transmits the relative position and orientation between the index and main image capturing device 101L measured in step 505 to the sub information processing apparatus 301 via the transmission unit 211.

On the other hand, as a result of comparison in step 502, if deviations are detected, the process advances from step 503 to step 507.

In step 507, the error detection unit 209 transmits a message indicating that errors have occurred in the intrinsic parameters of the main image capturing device 101L to the sub information processing apparatus 301 via the transmission unit 211.

In step 508, the error processing unit 210 decides processing to be executed at the time of occurrence of errors. More specifically, when it is judged in step 503 that the intrinsic parameter values of the main image capturing device 101L have deviations, the unit 210 decides to execute processing for calibrating the intrinsic parameters and inter-device position and orientation information (for example FIG. 6A).

In step 509, the processing decided in step 508 is executed.

The processing of the sub information processing apparatus 301 will be described below.

In step 510, the intrinsic parameter measurement unit 306 measures intrinsic parameters of the sub image capturing device 101R.

In step 511, the error detection unit 308 calculates deviations between the intrinsic parameter values (actual values) measured in step 510 and those which are stored in the information storage unit 307 and are being applied. The calculation result is supplied to the error processing unit 309.

If the message indicating that no errors occur in the intrinsic parameters is received from the main information processing apparatus 201 in step 512, it is sent to the error processing unit 309.

If the position and orientation of the main image capturing device 101L are received from the main information processing apparatus 201 in step 513, the process advances to step 514.

In step 514, the position and orientation measurement unit 305 measures an inter-image capturing device position and orientation as a relative position and orientation between the main image capturing device 101L and sub image capturing device 101R. An inter-image capturing device position and orientation measurement method is as follows. That is, the position and orientation measurement unit 305 reads a position of each index detected by the index detection unit 304 on an image and a size of that index itself from the image, and calculates a relative position and orientation between that index and sub image capturing device 101R from these pieces of information. The position and orientation measurement unit 305 calculates the inter-image capturing device position and orientation from this calculation result and the position and orientation of the main image capturing device 101L received in step 513.

In step 515, the error detection unit 308 compares the inter-image capturing device position and orientation values (actual values) measured in step 514, and those which are stored in the information storage unit 307 and are currently being applied. In this comparison, whether or not a difference between the values of the inter-image capturing device position and orientation measured in step 514 and those stored in the information storage unit 307 exceeds a predetermined value is checked to detect the presence/absence of deviations. The error detection unit 308 supplies the result of this comparison, in other words, a result as to whether or not the inter-image capturing device positions and orientations have deviations to the error processing unit 309.

If the receiving unit 302 receives the message indicating that errors have occurred in the intrinsic parameters from the main information processing apparatus 201 in step 516, it notifies the error processing unit 309 of that message.

The error processing unit 309 judges in step 517 from information indicating the presence/absence of occurrence of errors obtained in steps 511, 512, 515, and 516 whether or not to execute processing at the time of occurrence of errors.

That is, by judging the presence/absence of occurrence of errors, the correction timings of the intrinsic parameters or inter-device position and orientation information can be detected.

If it is judged that the processing at the time of occurrence of errors is to be executed, the error processing unit 309 decides processing to be executed in step 518.

If the deviations of the intrinsic parameters of the sub image capturing device 101R calculated in step 511 exceed a predetermined threshold, the error processing unit 309 decides processing for calibrating the intrinsic parameters of the sub image capturing device 101R and the inter-device position and orientation information. If deviations are detected in the inter-device position and orientation information in step 515, if the message indicating that no errors occur in the intrinsic parameters of the main image capturing device 101L is received in step 512, and if it is judged in step 511 that no deviations are generated in the intrinsic parameters of the sub image capturing device 101R, the unit 309 decides to execute only calibration processing of the inter-device position and orientation information (for example, FIG. 6B). If the message indicating that the intrinsic parameter values of the main image capturing device 101L have deviated is received in step 516, the unit 309 does not execute any processing.

That is, by comparing the parameter deviation conditions of the main image capturing device 101L and sub image capturing device 101R with each other, which of the intrinsic parameters and inter-device position and orientation information are/is to be calibrated can be detected.

In step 519, the error processing unit 309 executes the processing decided in step 518.

The processing to be executed by the main information processing apparatus 201 (which is decided in step 508 and is executed in step 509) and by the sub information processing apparatus 301 (which is decided in step 518 and is executed in step 519) will be described below with reference to the flowcharts shown in FIGS. 6A and 6B.

Figure 6A:
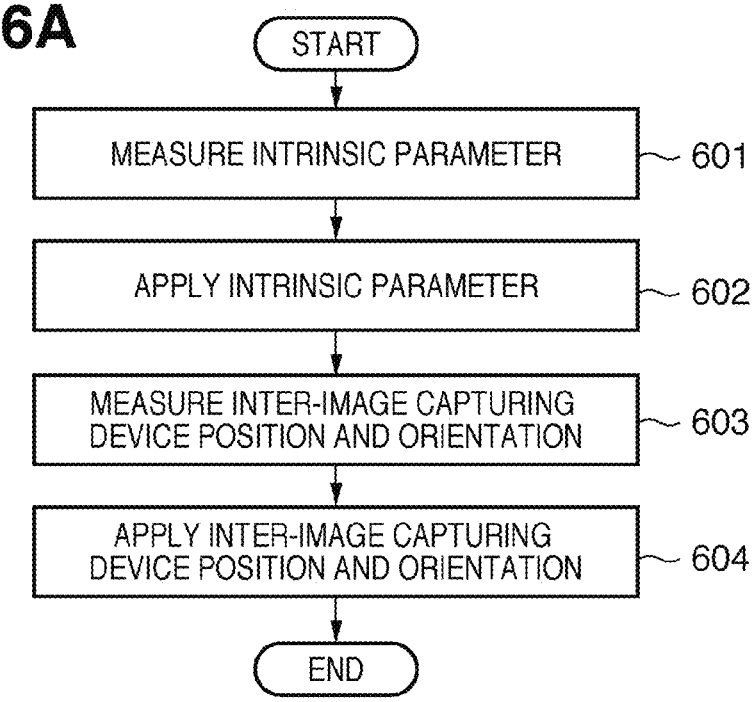
FIGS. 6A and 6B are flowcharts showing calibration processing from the main information processing apparatus according to the first embodiment.

FIG. 6A shows the processing to be executed by the main information processing apparatus 201 and sub information processing apparatus 301 when the deviations have been detected in the intrinsic parameters of the main image capturing device 101L (YES in step 503). The processing shown in FIG. 6A is executed only by the sub information processing apparatus 301:

when no deviations are detected in the intrinsic parameters of the main image capturing device 101L in step 503; and when deviations have been detected in the intrinsic parameters of the sub image capturing device 101R or inter-image capturing device position and orientation in step 511 or 515.

In step 601, the error processing units 210 and 309 control the intrinsic parameter measurement units 207 and 306 to measure intrinsic parameters. The measurement results of the intrinsic parameters in steps 501 and 510 may be used intact.

In step 602, the error processing units 210 and 309 replace the intrinsic parameters, which are stored in the information storage units 208 and 307 and are currently being applied, by the values acquired in step 601, and apply the replaced parameters. The processes by the error processing unit 210 are completed in this step, and the following processes in steps 603 and 604 are executed only by the error processing unit 309.

In step 603, the error processing unit 309 controls the position and orientation measurement unit 305 to measure an inter-image capturing device position and orientation. The measurement result in step 514 may be used intact. The inter-image capturing device position and orientation measurement method is as has been described above in step 514.

In step 604, the error processing unit 309 replaces the inter-image capturing device position and orientation, which are stored in the information storage unit 307 and are currently being applied, by the values acquired in step 603, and applies the replaced position and orientation.

Figure 6B:
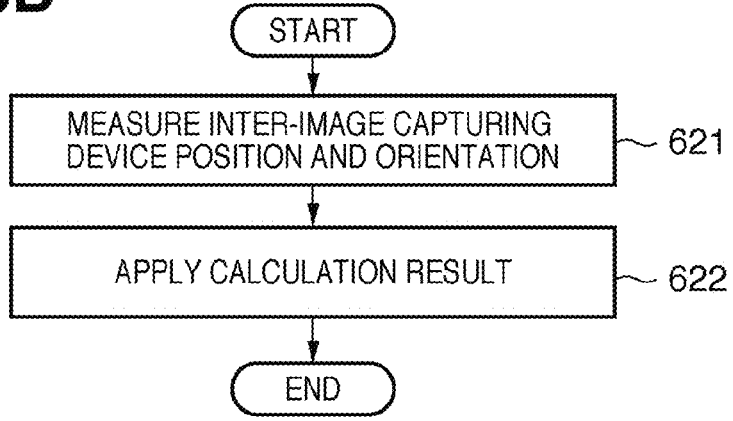

If no deviations are detected by comparison of the intrinsic parameters in steps 502 and 511 and deviations are detected in only the inter-image capturing device position and orientation in step 515, the error processing unit 309 may execute the processing shown in FIG. 6B. That is, in step 621 the error processing unit 309 controls the position and orientation measurement unit 305 to measure an inter-image capturing device position and orientation. The measurement result in step 514 may be used intact. In step 622, the error processing unit 309 replaces the inter-image capturing device position and orientation, which are stored in the information storage unit 307 and are currently being applied, by the values acquired in step 621, and applies the replaced position and orientation.

Figure 7:
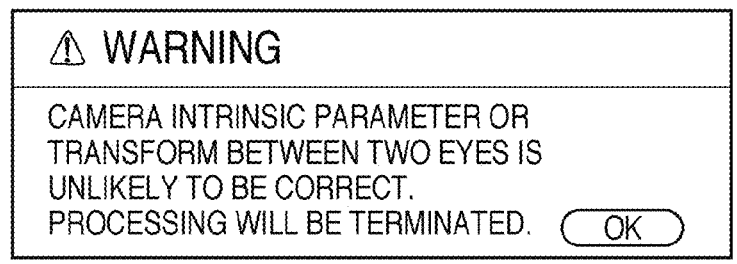
FIG. 7 is a view showing a warning display example.

In addition, the error processing units 210 and 309 may display a warning message shown in FIG. 7 in steps 509 and 519. The warning message may be displayed either before or after the processing described using FIGS. 6A and 6B. Alternatively, the user may be notified of a warning by means of a buzzer or voice. Alternatively, after the warning message is displayed, some or all of programs required to implement stereoscopic viewing may be forcibly terminated without executing the processing in FIGS. 6A and 6B. The user may set one of these processes to be executed as the processing at the time of occurrence of errors.

Figure 8:
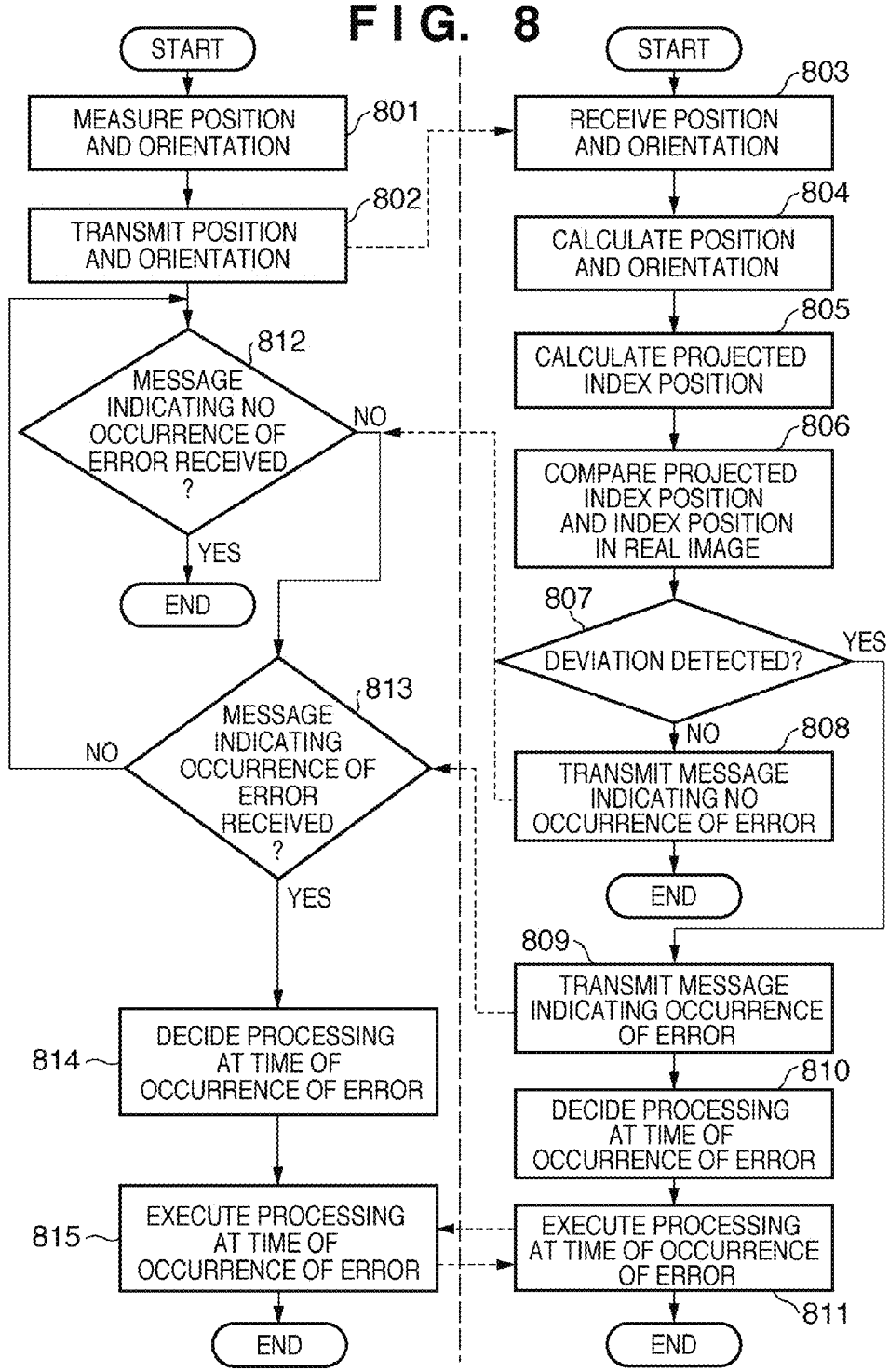
FIG. 8 is a flowchart for explaining processing of the sub information processing apparatus by a system according to the first embodiment.

FIG. 8 is a flowchart for explaining the processing of the sub information processing apparatus by the system according to this embodiment. The embodiment of the present invention will be described below with reference to the flowchart shown in FIG. 8. This embodiment decides execution of calibration processing upon detection of occurrence of deviations in the inter-device position and orientation information. In FIG. 8, the left side of the vertical dotted line of the flowchart shows the processing sequence of the main information processing apparatus 201, and the right side shows that of the sub information processing apparatus 301.

In step 801, the position and orientation measurement unit 206 measures the position and orientation of the main image capturing device 101L. The measurement method is as follows. The position and orientation measurement unit 206 calculates a relative position and orientation between a given index detected by the index detection unit 205 and the main image capturing device 101L based on the position of that index on an image and a size of the index itself appended to the index. The position and orientation measurement unit 206 calculates the position and orientation of the main image capturing device 101L based on the calculated relative position and orientation and index definition information stored in the information storage unit 208.

In step 802, the position and orientation measurement unit 206 transmits the measurement result in step 801 to the sub information processing apparatus 301 via the transmission unit 211.

In step 803, the receiving unit 302 of the sub information processing apparatus 301 receives this result.

In step 804, the position and orientation measurement unit 305 measures the position and orientation of the sub image capturing device 101R. In this case, the unit 305 calculates the position and orientation of the sub image capturing device 101R based on those of the main image capturing device 101L received from the main information processing apparatus 201 in step 803 and an inter-image capturing device position and orientation stored in the information storage unit 307.

In step 805, the virtual image generation unit 311 projects each index detected by the index detection unit 304 onto a projection plane based on the position and orientation of the sub image capturing device 101R, and calculates an index position on the projection plane (projected index position).

In step 806, the error detection unit 308 compares the values of the projected index position calculated in step 805 and the position of the index on a real image captured by the sub image capturing device 101R. Note that the real image position of the index on the captured image is detected by the index detection unit 304.

The error detection unit 308 judges in step 807 as a result of comparison between the index positions in step 806 whether or not a deviation is detected between the projected index position and the index position on the real image.

If it is judged in step 807 that no deviation is detected, the error detection unit 308 transmits a message indicating that no error occurs to the main information processing apparatus 201 via the transmission unit 310 in step 808. Then, processing associated with parameter correction on the sub information processing apparatus 301 side ends.

On the other hand, if it is judged in step 807 that a deviation is detected between the projected index position and the index position on the real image, the error detection unit 308 transmits a message indicating that an error has occurred to the main information processing apparatus 201 via the transmission unit 310 in step 809.

In step 810, the error processing unit 309 decides processing at the time of occurrence of an error in the sub information processing apparatus 301.

In step 811, the processing decided in step 810 is executed. The processing to be executed will be described later with reference to the flowchart shown in FIG. 9.

In steps 812 and 813, the receiving unit 203 of the main information processing apparatus 201 receives, from the sub information processing apparatus 301, and judges the message indicating whether or not an error has occurred. If it is judged that no error occurs, the processing associated with parameter correction in the main information processing apparatus 201 ends. On the other hand, if the receiving unit 203 of the main information processing apparatus 201 receives, from the sub information processing apparatus 301, the message indicating that an error has occurred, the process advances to step 814.

In step 814, the error processing unit 210 decides processing at the time of occurrence of an error in the main information processing apparatus 201.

In step 815, the processing decided in step 814 is executed.

Figure 9:
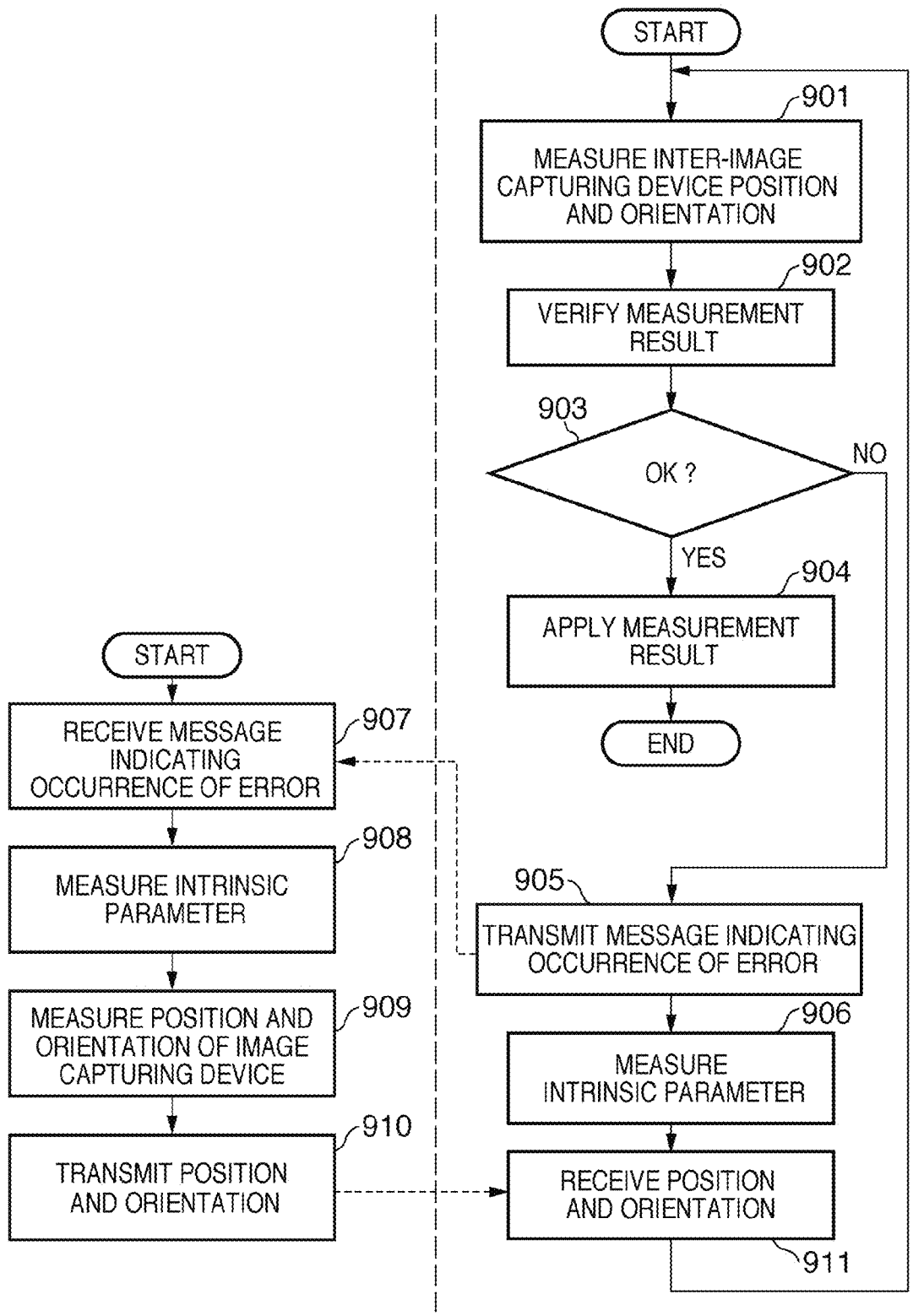
FIG. 9 is a flowchart showing calibration processing from the sub information processing apparatus according to the first embodiment.

FIG. 9 is a flowchart showing the calibration processing of this embodiment. The calibration processing to be executed at the time of occurrence of an error will be described below with reference to the flowchart shown in FIG. 9. The left side of the vertical dotted line of the flowchart shows the processing sequence (step 815) of the main information processing apparatus 201, and the right side shows that (step 811) of the sub information processing apparatus 301. In the calibration processing of this embodiment, the inter-device position and orientation information is calibrated, and intrinsic parameters are calibrated as needed (according to the verification result of the calibrated inter-device position and orientation information).

In step 901, the error processing unit 309 of the sub information processing apparatus 301 controls the position and orientation measurement unit 305 to measure an inter-image capturing device position and orientation. The inter-image capturing device position and orientation measurement method is as has been described above.

In step 902, the error processing unit 309 verifies the measurement result in step 901. As the verification method, for example, the same method described in the flowchart of FIG. 8 can be used. That is, the error processing unit 309 controls the error detection unit 308 to compare the projected index position acquired using the inter-image capturing device position and orientation obtained in step 901, and the index position on a real image. The error processing unit 309 determines based on that comparison result whether or not a deviation has occurred, and verifies whether or not the values of the inter-image capturing device position and orientation measured in step 901 are correct.

If it is determined in step 903 that the verification result in step 902 is correct, the process advances to step 904.

In step 904, the error processing unit 309 replaces the inter-image capturing device position and orientation, which are stored in the information storage unit 307 and are currently being applied, by the values measured in step 901, and applies the replaced inter-image capturing device position and orientation. Then, the unit 309 ends the processing at the time of occurrence of an error in step 811.

On the other hand, if it is determined in step 903 that the verification result in step 902 is incorrect, the process advances to step 905.

In step 905, the error processing unit 309 transmits a message indicating that the inter-image capturing device position and orientation are incorrect to the main information processing apparatus 201.

In step 906, the error processing unit 309 controls the intrinsic parameter measurement unit 306 to measure the intrinsic parameters of the sub image capturing device 101R, and updates the information storage unit 307 by the measured intrinsic parameters.

On the other hand, if the error processing unit 210 of the main information processing apparatus 201 receives, from the sub information processing apparatus 301, the message indicating that the inter-image capturing device position and orientation are incorrect in step 907, the process advances to step 908.

In step 908, the error processing unit 210 controls the intrinsic parameter measurement unit 207 to measure the intrinsic parameters of the main image capturing device 101L, and updates the information storage unit 208 by the measured intrinsic parameters.

In step 909, the error processing unit 210 controls the position and orientation measurement unit 206 to measure the position and orientation of the main image capturing device 101L.

In step 910, the error processing unit 210 transmits the position and orientation measured in step 909 to the sub information processing apparatus 301 via the transmission unit 211.

If the receiving unit 302 receives the position and orientation of the main image capturing device 101L from the main information processing apparatus 201 in step 911, the error processing unit 309 of the sub information processing apparatus 301 returns the process to step 901 to measure the inter-image capturing device position and orientation. After that, the processes from step 901 described above are repeated again.

Note that the processing executed at the time of occurrence of errors may be that shown in FIGS. 6A and 6B. In addition, the warning message shown in FIG. 7 may be displayed. The warning message may be displayed before or after the processing described using FIG. 6A, 6B or FIG. 9. Also, some or all of programs required to implement stereoscopic viewing may be forcibly terminated after the warning message is displayed, without executing the processing shown in FIG. 6A, 6B, or 9.

Second Embodiment

Figure 10:
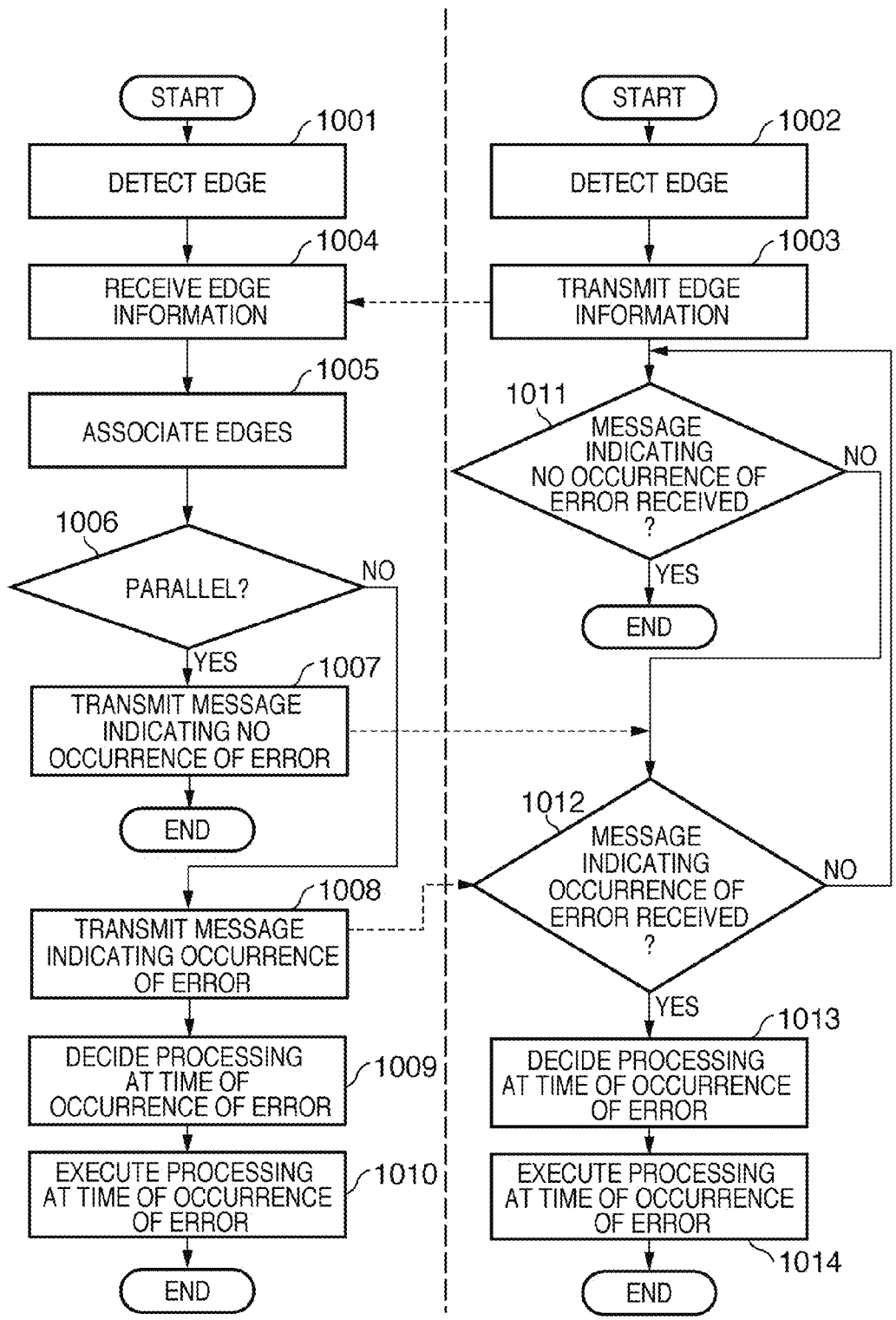
FIG. 10 is a flowchart for explaining processing by a system according to the second embodiment.

In the second embodiment, the validity of inter-device position and orientation information or intrinsic parameters is determined using edges included in images obtained from respective image capturing devices. The second embodiment will be described below with reference to the flowchart shown in FIG. 10. The left side of the vertical dotted line of the flowchart shows the processing sequence of a main information processing apparatus 201, and the right side shows that of the sub information processing apparatus 301.

In steps 1001 and 1002, an error detection unit 209 of the main information processing apparatus 201 and an error detection unit 308 of the sub information processing apparatus 301 extract edges from images captured by a main image capturing device 101L and sub image capturing device 101R. Assume that an edge is, for example, a point where densities change abruptly in an image.

In step 1003, the error detection unit 308 of the sub information processing apparatus 301 transmits the extracted edge information to the main information processing apparatus 201.

In step 1004, the error detection unit 209 of the main information processing apparatus 201 receives the edge information from the sub information processing apparatus 301, and associates the received edge information with that extracted by itself.

The error detection unit 209 verifies in step 1005 whether or not the edges associated with each other in step 1004 are parallel to each other.

The error detection unit 209 determines in step 1006 whether or not the edges are parallel to each other.

If it is determined in step 1006 that the edges are parallel to each other, the error detection unit 209 transmits a message indicating that no error occurs to the sub information processing apparatus 301 in step 1007, thus ending the processing.

On the other hand, if it is determined in step 1006 that the edges are not parallel to each other, the error detection unit 209 transmits a message indicating that an error has occurred to the sub information processing apparatus 301 in step 1008, and the process advances to step 1009.

In step 1009, an error processing unit 210 decides calibration processing at the time of occurrence of an error. The processing decided in this step is the same as that in the first embodiment.

In step 1010, the processing decided in step 1009 is executed.

If the error detection unit 308 of the sub information processing apparatus 301 receives the message indicating that no error occurs from the main information processing apparatus 201 in step 1011, the processing in the sub information processing apparatus 301 ends.

If the error detection unit 308 receives the message indicating that an error has occurred in step 1012, the process advances to step 1013.

In step 1013, an error processing unit 309 decides processing at the time of occurrence of an error. The processing contents to be decided are the same as those in step 1009.

In step 1014, the processing decided in step 1013 is executed. Note that the processing to be executed at the time of occurrence of an error is as has been described in the first embodiment. In this embodiment, the main information processing apparatus 201 determines whether or not the edges are parallel to each other. Alternatively, the sub information processing apparatus 301 may determine whether or not the edges are parallel to each other.

Third Embodiment

Figure 11:
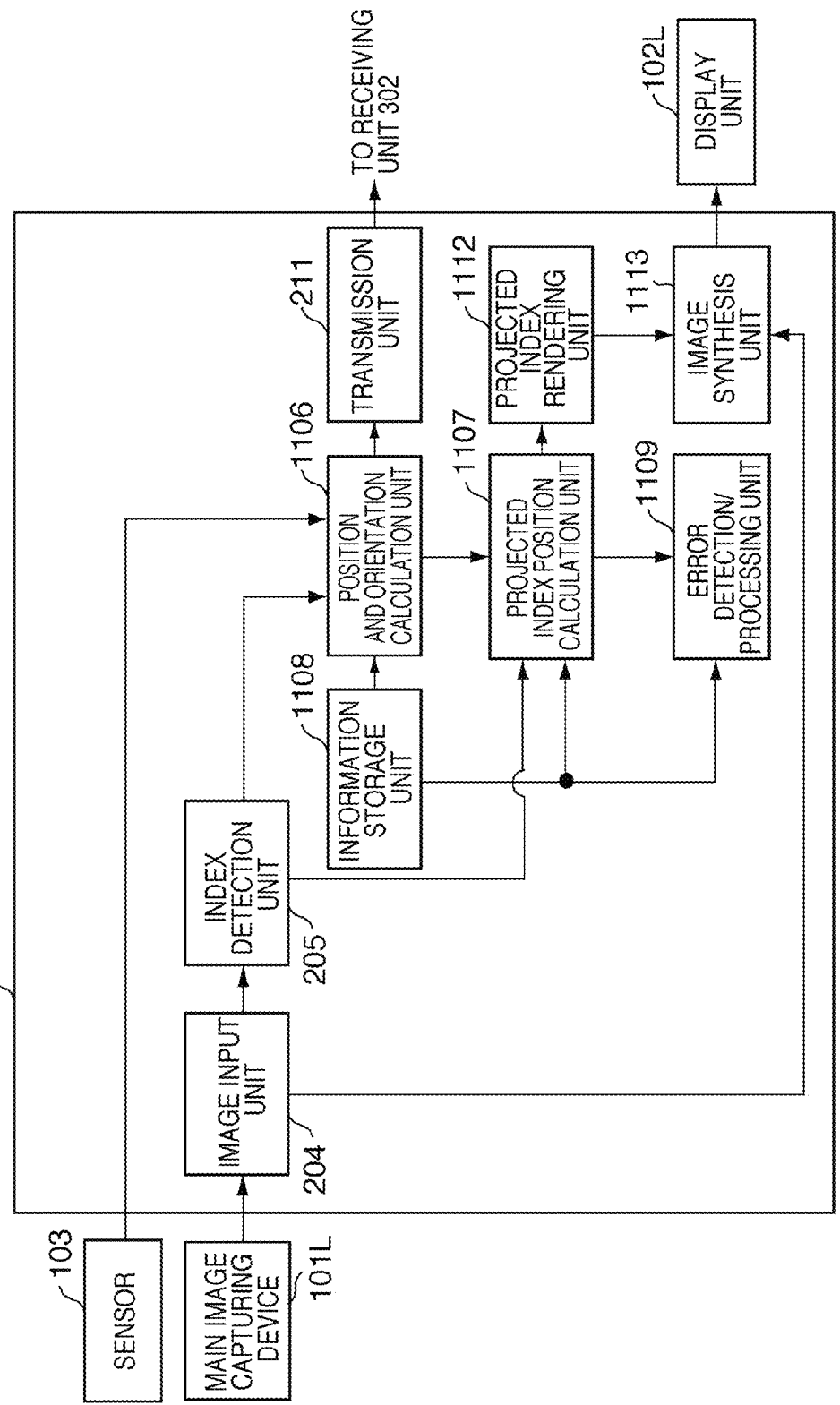
FIG. 11 is a block diagram of a main information processing apparatus according to the third and fourth embodiments.
Figure 12:
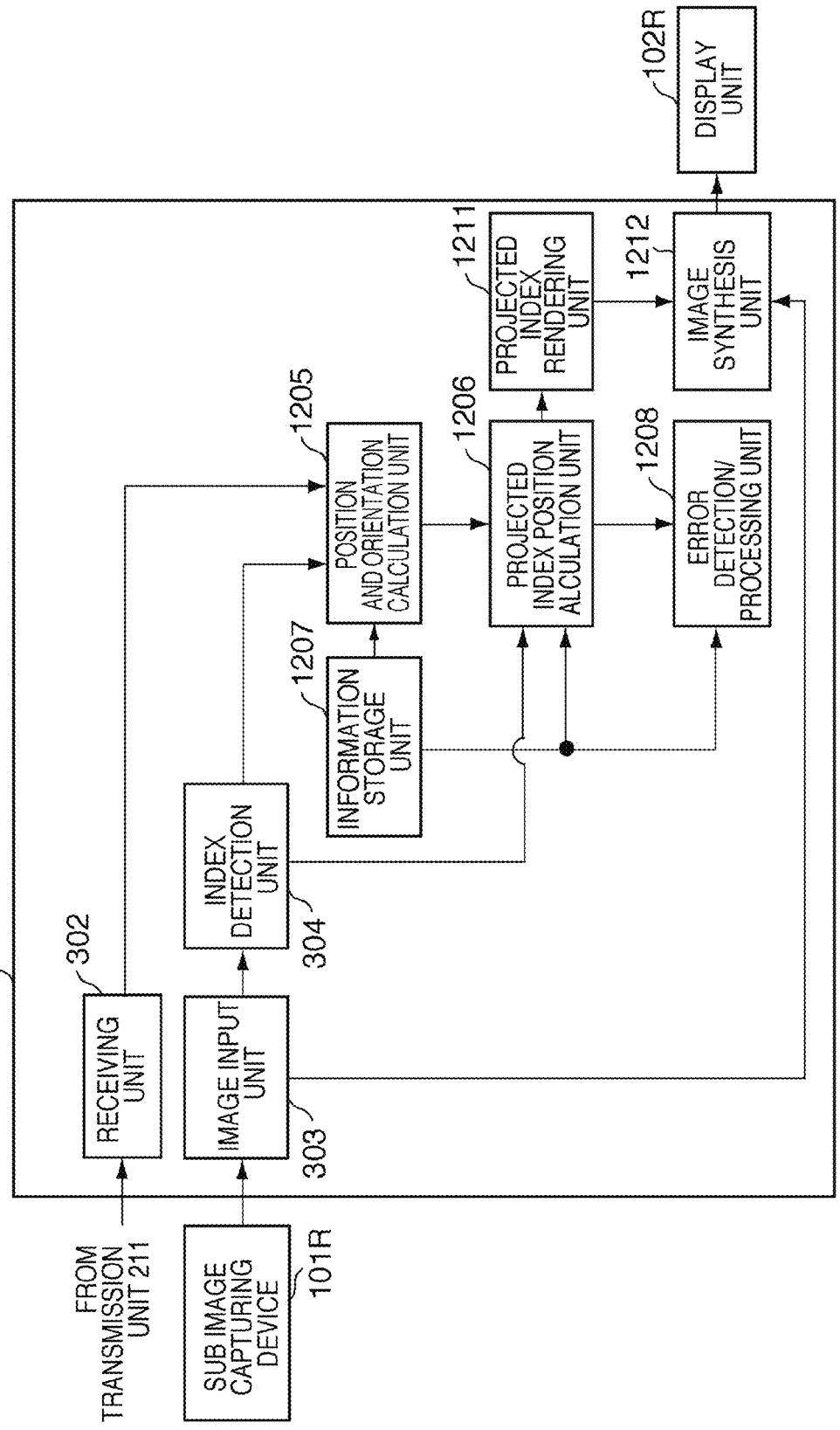
FIG. 12 is a block diagram of a sub information processing apparatus according to the third and fourth embodiments.

FIGS. 11 and 12 are block diagrams showing the arrangements of information processing apparatuses according to the third embodiment. The third embodiment will be described below with reference to FIGS. 11 and 12. FIG. 11 shows the arrangement of a main information processing apparatus 201 connected to a main image capturing device 101L, and FIG. 12 shows the arrangement of a sub information processing apparatus 301 connected to a sub image capturing device 101R. Compared to the arrangements of the first embodiment (FIGS. 2 and 3), a communication direction is only that from the main information processing apparatus 201 to the sub information processing apparatus 301.

An information storage unit 1108 holds index definition information which defines positions and orientations of indices on a real space. This definition information has to be generated in advance. As the generation method, the definition information may be generated by, for example, manually measuring the position and orientation of each index, or by capturing an image including indices and performing three-dimensional reconstruction from the captured image.

A position and orientation calculation unit 1106 calculates the position and orientation of the main image capturing device 101L from position and orientation information acquired from a position and orientation sensor 103. Alternatively, the unit 1106 calculates the position and orientation based on each index detected by an index detection unit 205 and the index definition information held in the information storage unit 1108. Alternatively, the unit 1106 calculates the position and orientation by combining these methods.

A transmission unit 211 transmits the position and orientation of the main image capturing device 101L calculated by the position and orientation calculation unit 1106 to a receiving unit 302 of the sub information processing apparatus 301.

A projected index position calculation unit 1107 projects each index detected by the index detection unit 205 onto a captured image based on the position and orientation of the main image capturing device 101L calculated by the position and orientation calculation unit 1106 and the index definition information held in the information storage unit 1108, and calculates the position of the index on the image. An error detection/processing unit 1109 detects an error between the index in the captured image and the projected index position on the image. When an error (that exceeds a predetermined amount) is detected, the unit 1109 executes processing which is set in advance by the user. In this embodiment, assume that the user sets one of "automatic execution of calibration", "forcibly terminate after a warning message is displayed", and "only display a warning message" (details will be described later).

A projected index rendering unit 1112 renders the projected index at the position on the captured image calculated by the projected index position calculation unit 1107.

An image synthesis unit 1113 generates a synthesized image by synthesizing an image input by an image input unit 204 and the projected index rendered by the projected index rendering unit 1112, and transmits that image to a display unit 102L. The display unit 102L displays the synthesized image.

The sub information processing apparatus 301 of this embodiment will be described below with reference to FIG. 12.

A receiving unit 302 receives the position and orientation of the main image capturing device 101L transmitted from the transmission unit 211, and transmits them to a position and orientation calculation unit 1205. An information storage unit 1207 holds index definition information which defines positions and orientations of indices on the real space, and the position and orientation relationship between the main image capturing device 101L and sub image capturing device 101R. This definition information has to be generated in advance by the same method as described above. The position and orientation calculation unit 1205 calculates the position and orientation of the sub image capturing device 101R using those of the main image capturing device 101L received by the receiving unit 302, and the position and orientation relationship between the main image capturing device 101L and sub image capturing device 101R, which is held in the information storage unit 1207.

A projected index position calculation unit 1206 projects each index detected by an index detection unit 304 onto a captured image based on the position and orientation of the sub image capturing device 101R calculated by the position and orientation calculation unit 1205, and the index definition information held in the information storage unit 1207, and calculates the position of the index on the image.

An error detection/processing unit 1208 detects an error between the index in the captured image and the projected index position on the image. A projected index rendering unit 1211 renders the projected index at the position on the captured image calculated by the projected index position calculation unit 1206.

An image synthesis unit 1212 generates a synthesized image by synthesizing an image input by an image input unit 303 and the projected index rendered by the projected index rendering unit 1211, and transmits that image to a display unit 102R. The display unit 102R displays the synthesized image.

Note that the main image capturing device 101L and sub image capturing device 101R are connected to independent information processing apparatuses such as the main information processing apparatus 201 and sub information processing apparatus 301 in FIGS. 11 and 12. However, the present invention is not limited to this. For example, the main image capturing device 101L and sub image capturing device 101R may be connected to a single information processing apparatus, as described in the first embodiment. Also, the hardware arrangement of a computer applicable to the aforementioned main information processing apparatus 201 and sub information processing apparatus 301 is as has been described previously using FIG. 1B.

Figure 13:
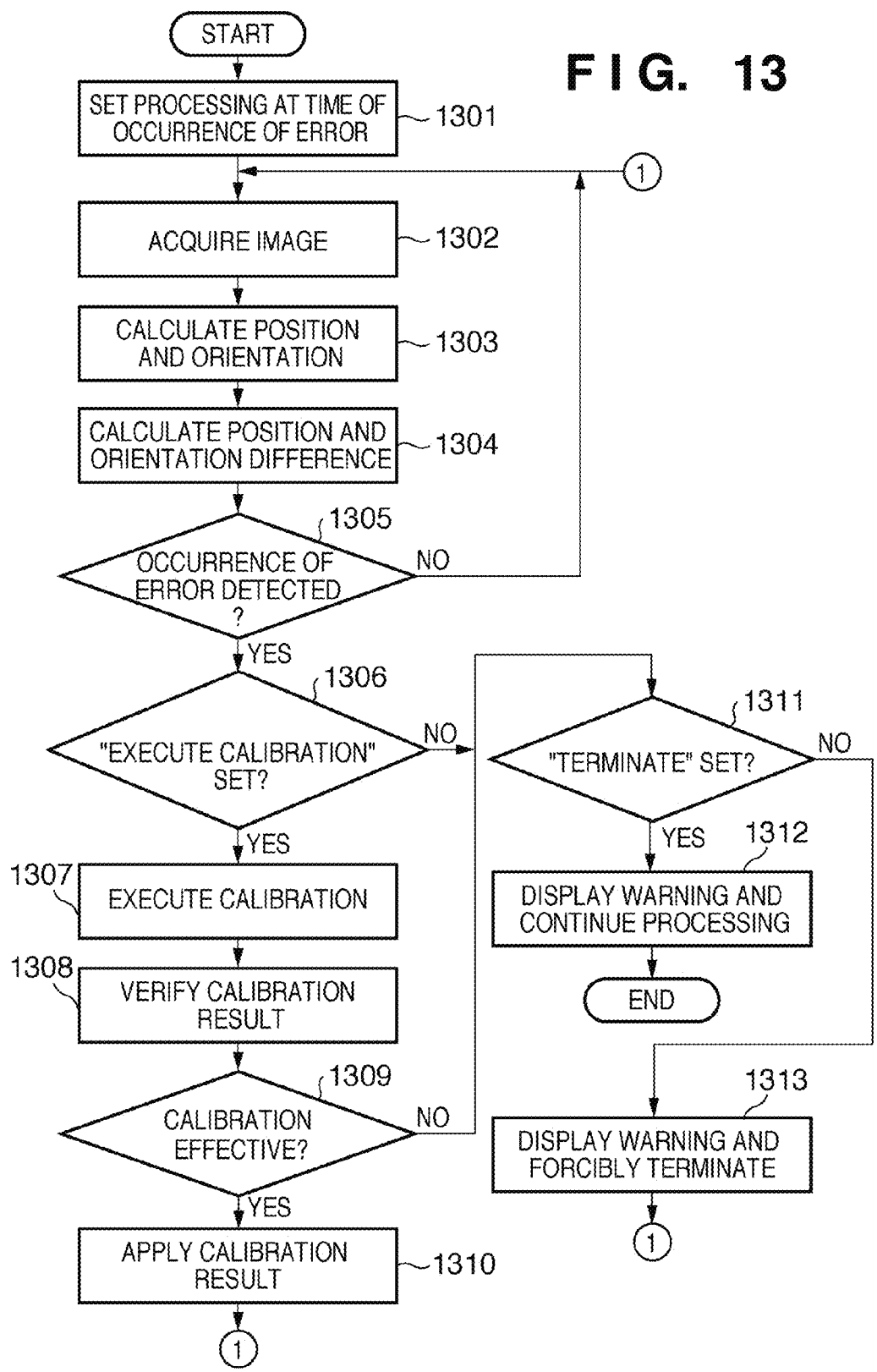
FIG. 13 is a flowchart for explaining processing by a system according to the third embodiment.

FIG. 13 is a flowchart for explaining processing by a system of this embodiment. The processing of this embodiment will be described below with reference to the flowchart shown in FIG. 13. The operation in the main information processing apparatus 201 will be described first.

In step 1301, the error detection/processing unit 1109 sets processing to be executed when errors occur between the position and orientation of the main image capturing device 101L calculated by the position and orientation measurement unit 206 and the actual position and orientation. The processing to be executed is one of "automatic execution of calibration", "forcibly terminate after a warning message is displayed", and "only display a warning message". Note that the error detection/processing unit 1109 transmits the set processing to the sub information processing apparatus 301 via the transmission unit 211. This is to match the processing at the time of occurrence of errors between the main information processing apparatus 201 and sub information processing apparatus 301.

In step 1302, the image input unit 204 inputs an image obtained by capturing an image of the real space using the main image capturing device 101L.

In step 1303, the index detection unit 205 detects indices from the image input by the image input unit 204, and the position and orientation calculation unit 1106 calculates the position and orientation of the main image capturing device 101L based on, for example the positions of the indices detected by the index detection unit 205 on the image. The position and orientation calculation unit 1106 transmits the calculated position and orientation to the sub information processing apparatus 301 via the transmission unit 211.

In step 1304, the projected index position calculation unit 1107 projects the indices detected by the index detection unit 205 onto the captured image based on the position and orientation of the main image capturing device 101L calculated by the position and orientation calculation unit 1106, and the index definition information held in the information storage unit 1108. Then, the unit 1107 calculates the positions of these projected indices on the image. The projected index rendering unit 1112 renders the indices using the calculated projected index positions and the definition information of these indices. The image synthesis unit 1113 synthesizes the projected index images rendered by the projected index rendering unit 1112 to the captured image, and displays the synthesized image on the display unit 102L.

Figure 14A:
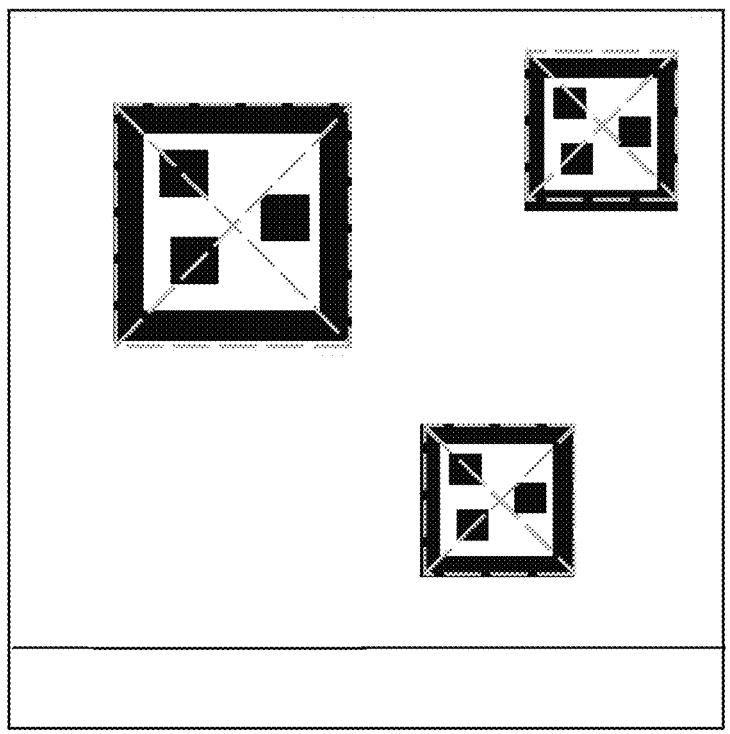
FIGS. 14A and 14B are views showing an example of a synthesized image according to the third embodiment.
Figure 14B:
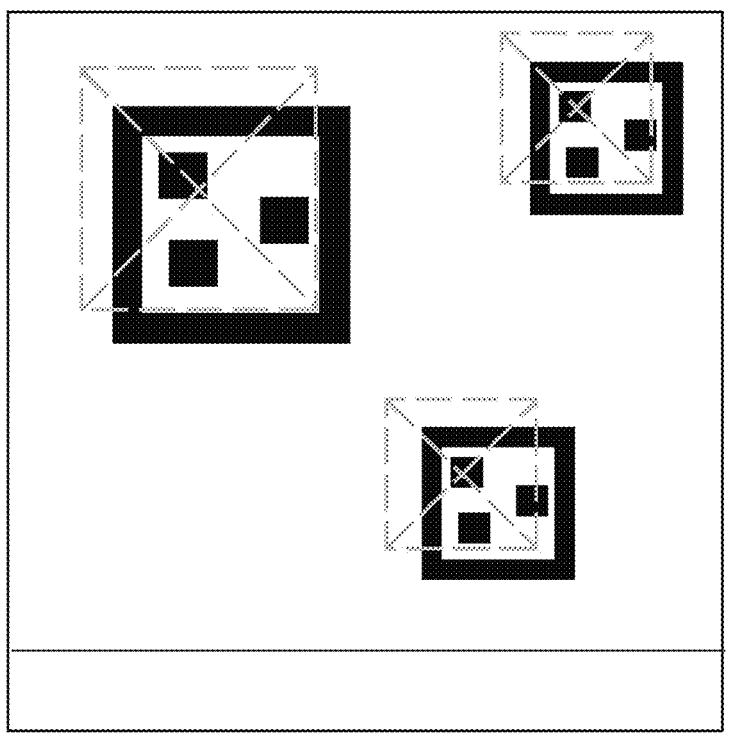

The error detection/processing unit 1109 determines in step 1305 whether or not the index position in the captured image matches the projected index position. FIGS. 14A and 14B show examples of synthesized images obtained when the image synthesis unit 1113 synthesizes the projected index images rendered by the projected index rendering unit 1112 to the captured image. The broken lines indicate the projected indices, and the remaining portion is the captured image. FIG. 14A expresses that the positions of the indices in the captured image match the projected index positions, and no error is detected. On the other hand, in FIG. 14B, the index positions in the captured image do not match the projected index positions. This expresses that the position and orientation of the main image capturing device 101L calculated by the position and orientation calculation unit 1106 do not match the actual position and orientation. The error detection/processing unit 1109 determines in step 1305 whether or not the index positions in the captured image match the projected index positions. If it is determined that these positions match, the process returns to step 1302. On the other hand, if it is determined in step 1305 that the index positions in the captured image do not match the projected index positions (if it is determined that errors are detected), the process advances to step 1306. Note that whether or not the index positions in the captured image match the projected index positions can be determined by seeing if a difference between a real image position of each index detected from the captured image by the index detection unit 205 and the corresponding projected index position calculated by the projected index calculation unit 1107 falls within a predetermined range.

The error detection/processing unit 1109 judges in step 1306 if the processing at the time of occurrence of errors set in step 1301 is "automatic execution of calibration".

If it is judged in step 1306 that "automatic execution of calibration" is set, the error detection/processing unit 1109 executes calibration in step 1307. Details of the calibration will be described later.

In step 1308, the error detection/processing unit 1109 verifies the result of the calibration executed in step 1307. As an example of the verification method, a method of temporarily applying the calibration result to practice the processes (steps 1302 to 1304) until error detection and to check whether or not an error is detected may be used.

It is determined in step 1309 based on the verification result whether or not the calibration is effective.

If it is determined in step 1309 that the calibration is effective, the error detection/processing unit 1109 applies the calibration result in step 1310, and the process returns to step 1302.

On the other hand, if it is determined in step 1309 that the calibration is not effective, the process advances to step 1311.

The error detection/processing unit 1109 judges in step 1311 whether or not "forcibly terminate after a warning message is displayed" is set as the processing at the time of occurrence of errors.

If it is determined in step 1311 that "forcibly terminate after a warning message is displayed" is set, the error detection/processing unit 1109 displays a warning message shown in FIG. 7 on the display unit 102L in step 1312, thus terminating the processing.

On the other hand, if it is determined in step 1311 that "forcibly terminate after a warning message is displayed" is not set, in other words, if "only display a warning message" is set, the process advances to step 1313.

In step 1313, the error detection/processing unit 1109 displays a warning message shown in FIG. 7 on the display unit 102L, and continues the position and orientation calculations from step 1302. Note that if step 1311 is reached since NO is determined in step 1309, the process advances to step 1313, and the warning message shown in FIG. 7 is displayed on the display unit 102L. After that, the position and orientation calculations are continued.

The processing of the main information processing apparatus 201 has been described using the flowchart shown in FIG. 13. The same applies to the processing of the sub information processing apparatus 301. That is, units having the same names in FIG. 12 as those in FIG. 11 execute the aforementioned processes in association with the sub image capturing device 101R. However, in step 1301 the error detection/processing unit 1208 sets the processing transmitted from the main information processing apparatus 201 as that at the time of occurrence of errors. In step 1303, the position and orientation calculation unit 1205 calculates the position and orientation of the sub image capturing device 101R based on those of the main image capturing device 101L received by the receiving unit 302, and the position and orientation relationship between the main image capturing device and sub image capturing device, which is held in the information storage unit 1207. Furthermore, in step 1304, each index is projected onto the captured image based on the calculated position and orientation of the sub image capturing device 101R, and the index definition information held in the information storage unit 1207, and the position of that index on the image is calculated.

The sequence of the calibration (step 1307) of this embodiment will be described below with reference to the flowchart shown in FIG. 6A.

In step 601, the error detection/processing units 1109 and 1208 calculate intrinsic parameters of the image capturing devices 101L and 101R. The intrinsic parameters mean a focal length, principal point position, and distortion of an image capturing device. Such intrinsic parameters are calculated using a plurality of captured images including indices and a given method (for example introduction of an epipolar equation).

In step 602, the error detection/processing units 1109 and 1208 apply the calculated intrinsic parameters. The processes of the error detection/processing unit 1109 are completed in this step.

In step 603, the error detection/processing unit 1208 calculates an inter-image capturing device position and orientation between the main image capturing device 101L and sub image capturing device 101R. The inter-image capturing device position and orientation are calculated by:

acquiring a plurality of captured images from the sub image capturing device 101R, and acquiring the positions and orientations of the main image capturing device 101L at the same timings as these image capturing processes from the main information processing apparatus 201; and calculating, based on the positions and orientations of the main image capturing device 101L, the inter-image capturing device position and orientation so that indices in the captured image by the sub image capturing device 101R match projected indices.

Figure 15:
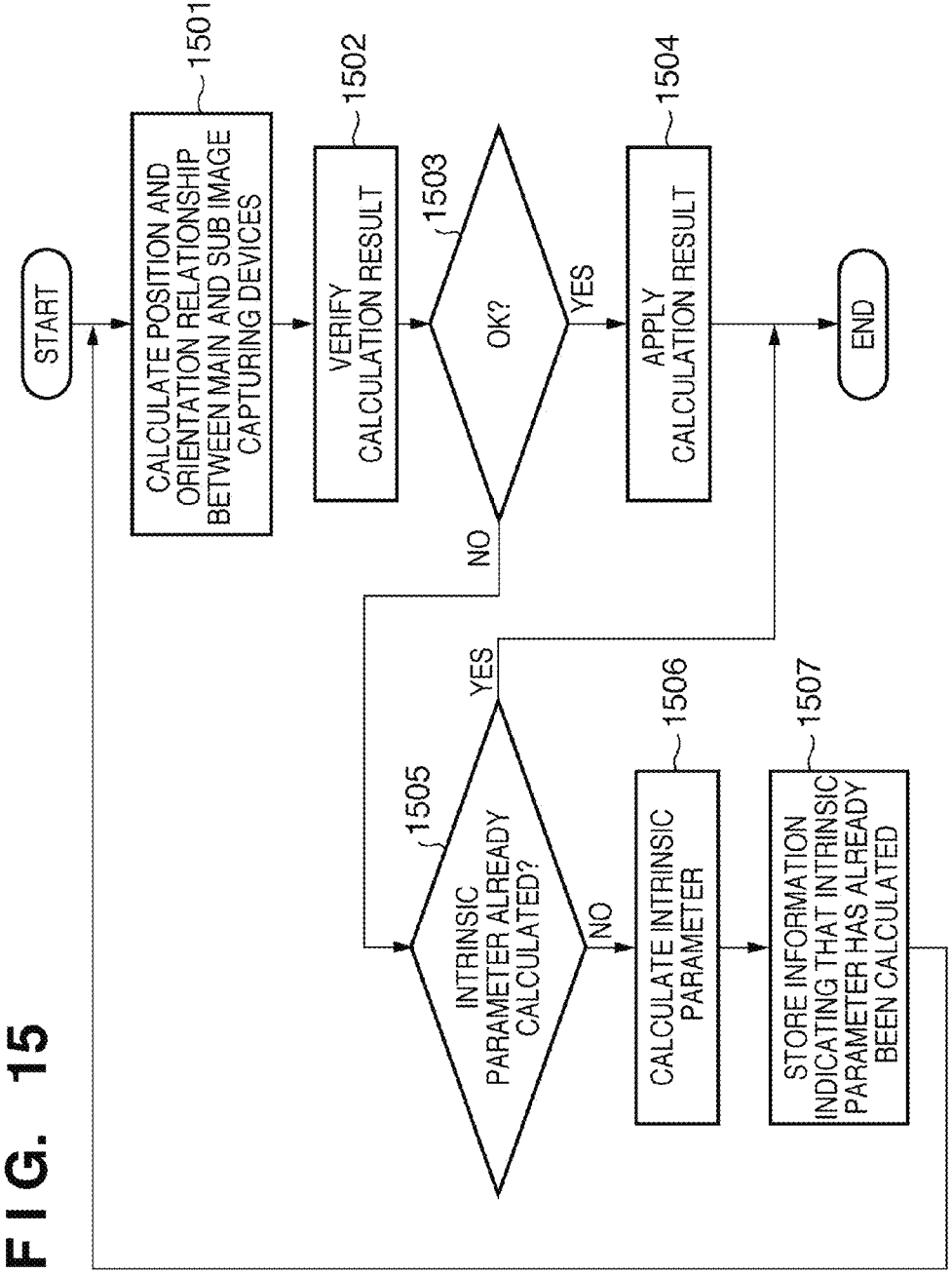
FIG. 15 is a flowchart showing calibration processing according to the third embodiment.

FIG. 15 is a flowchart showing calibration processing of this embodiment. Another pattern of the calibration processing will be described below with reference to the flowchart shown in FIG. 15.

In step 1501, the error detection/processing unit 1208 calculates the position and orientation relationship (inter-device position and orientation) between the main image capturing device 101L and sub image capturing device 101R. The position and orientation relationship calculation method is as has been described above in step 514 (FIG. 5) and the like.

In step 1502, the error detection/processing unit 1208 verifies the calculation result of the position and orientation relationship between the main image capturing device 101L and sub image capturing device 101R. As the verification method, a method of temporarily applying the calibration result to practice the processes (steps 1302 to 1304) until error detection and to check whether or not an error is detected may be used, as described in step 1308.

The error detection/processing unit 1208 determines in step 1503 whether or not the position and orientation relationship calculated in step 1501 is effective.

If it is determined in step 1503 that the position and orientation relationship is effective, the error detection/processing unit 1208 applies that calculation result in step 1504, thus ending the calibration.

On the other hand, if it is determined in step 1503 that the position and orientation relationship is not effective, the error detection/processing unit 1208 confirms in step 1505 if the calibration has done by checking if intrinsic parameters have already been calculated.

If it is confirmed in step 1505 that the intrinsic parameters have not been calculated yet, the error detection/processing unit 1208 calculates the intrinsic parameters in step 1506, and the process then advances to step 1507.

In step 1507, the error detection/processing unit 1208 records information indicating that intrinsic parameters have already been calculated, and the process returns to step 1501.

On the other hand, if it is confirmed in step 1505 that the intrinsic parameters have already been calculated, the calibration processing ends.

FIGS. 16A and 16B show examples of synthesized images generated by the image synthesis units 1113 and 1212. FIG. 16A shows the case in which indices in a captured image do not match projected indices in both the synthesized images generated by the image synthesis units 1113 and 1212. In this case, since it is considered that the camera intrinsic parameters are different from actual values, the calibration processing shown in FIG. 6A is suitably executed. FIG. 16B shows the case in which indices in a captured image do not match projected indices in only the synthesized image generated by the image synthesis unit 1212 (sub information processing apparatus 301). In this case, since it is considered that the camera intrinsic parameters are correct, and only the position and orientation relationship between the main image capturing device 101L and sub image capturing device 101R is different from actual values, the calibration processing shown in FIG. 15 is suitably executed. Hence, the error detection/processing units 1109 and 1208 select and execute the calibration processing in this way.

Fourth Embodiment

Figure 17:
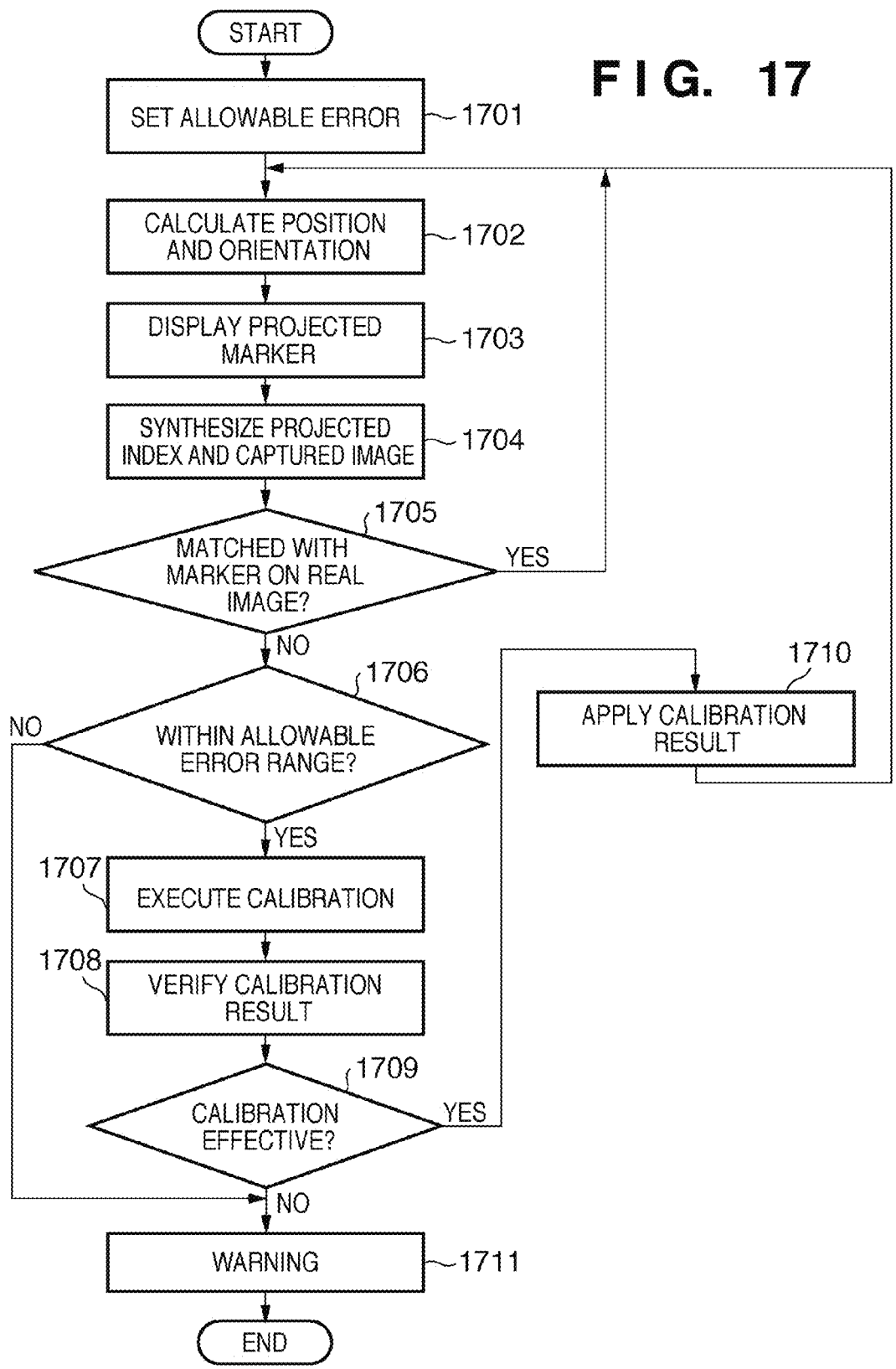
FIG. 17 is a flowchart for explaining processing by a system according to the fourth embodiment.

Processing associated with calibration of the fourth embodiment will be described below with reference to the flowchart shown in FIG. 17. Note that the arrangements of a main information processing apparatus 201 and sub information processing apparatus 301 are the same as those of the third embodiment (FIGS. 11 and 12).

In step 1701, an error detection/processing unit 1109 sets an allowable range of errors between projected indices and indices in a captured image. As a designation method of the allowable range, an error may be designated using the number of pixels, or by a ratio of the number of pixels of an error to the total number of pixels of a display unit 102L. Assume that the user makes such designation via a user interface (not shown).

In step 1702, a position and orientation calculation unit 1106 calculates a position and orientation of a main image capturing device 101L, and transmits the calculated position and orientation to the sub information processing apparatus 301 via a transmission unit 211. This processing is the same as in step 1303.

In step 1703, a projected index position calculation unit 1107 calculates projected positions of indices detected by an index detection unit 205 based on the position and orientation acquired in step 1702 and index definition information (held in an information storage unit 1108) of these indices. Then, a projected index rendering unit 1112 renders projected indices based on the calculated positions and index definition information.

In step 1704, an image synthesis unit 1113 generates a synthesized image by synthesizing the projected indices and a captured image.

The error detection/processing unit 1109 determines in step 1705 based on the synthesized image whether or not the indices in the captured image match the projected indices. That is, the unit 1109 determines whether or not the projected positions of the projected indices match the positions of the indices in the captured image detected by the index detection unit 205. If it is determined that the projected indices match the indices in the captured image, the process returns to step 1702; otherwise, the process advances to step 1706.

In step 1706, the error detection/processing unit 1109 calculates errors between the projected indices and the indices in the captured image, and determines whether or not the calculated errors fall within the allowable range set in step 1701. If it is determined that the errors fall within the allowable range, the process advances to step 1707. If it is determined that the errors fall outside the allowable range, the process jumps to step 1711, and a warning message shown in FIG. 7 is displayed, thus ending the processing.

In step 1707, the error detection/processing unit 1109 automatically executes calibration. The calibration processing is as has been described above.

In step 1708, the error detection/processing unit 1109 verifies the calibration result. The verification method is also as has been described above.

The error detection/processing unit 1109 determines in step 1709 based on the verification result if the calibration result is effective.

If it is determined in step 1709 that the calibration result is effective, the error detection/processing unit 1109 applies that calibration result in step 1710. The process then returns to step 1702 to continue position calculations.

On the other hand, if it is determined in step 1709 that the calibration result is not effective, the process advances from step 1709 to step 1711 to display a warning message shown in FIG. 7, thus ending the processing.

As described above, according to the respective embodiments, a VR space displayed when the camera intrinsic parameters or the relative position and orientation between the cameras have changed can be prevented from adversely affecting a viewer.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2009-123533, filed May 21, 2009, which is hereby incorporated by reference herein in its entirety.

What is claimed is:

1. An information processing apparatus, which provides images for stereoscopic viewing by synthesizing images, obtained by capturing an image of a real space by a stereoscopic viewing apparatus that mounts both a first image capturing device and a second image capturing device, with a virtual image, said apparatus comprising:
 a first acquisition unit configured to acquire a first captured image obtained by capturing an index on the real space by the first image capturing device;
 a first index detection unit configured to detect the index from the first captured image;
 a position and orientation measurements unit configured to measure a first position and orientation of the first capturing device based on the index detected by the first index detection unit;
 a holding unit configured to hold information including at least relative position and orientation information that indicates a relative position and orientation relationship between the first capturing device and the second capturing device;
 a first calculation unit configured to calculate a position and orientation of the second image capturing device, based on the relative position and orientation information held in the holding unit, and the first position and orientation of the first image capturing device measured by said position and orientation measurement unit;
 a second calculation unit configured to calculate a position of a projected index in a projection plane, by projecting the index detected from the first captured image on the projection plane based on the position and orientation of the second image capturing device calculated by the first calculation unit;
 a second acquisition unit configured to acquire a second captured image obtained by capturing an index on the real space by the second image capturing device;
 a second index detection unit configured to detect the index from the second captured image;
 an error detection unit configured to detect an error in the relative position and orientation information held in the holding unit by comparing positions of the projected index with the index detected by said second index detection unit; and
 an output unit configured to output the error when the error detection unit detects the error.

2. The apparatus according to claim 1, wherein the information held in the holding unit further includes an instrinsic parameter of the first and second image capturing devices, and
 said apparatus further comprises:
 a calibration target measurement unit configured to measure calibration target information including at least one of the relative position and orientation information, and the intrinsic parameter when said error detection unit detects an error;
 a determination unit configured to determine an error to be calibrated of the calibration target information by comparing the information held in the holding unit and the calibration target information measured by said calibration target information measurement unit; and
 a calibration unit configured to calibrate the information held in the holding unit, based on a determination result of said determination unit.

3. The apparatus according to claim 2, wherein said calibration target measurement unit measures the intrinsic parameters of the first and second image capturing devices from the first and second captured images, and
 when a difference between each of the intrinsic parameters measured by said calibration target measurement unit and each of the intrinsic parameters held in the holding unit exceeds a predetermined value, said determination unit determines to calibrate the intrinsic parameter which exceeds the predetermined value.

4. The apparatus according to claim 2, wherein said calibration target measurement unit measures the intrinsic parameters of the first and second image capturing devices from the first and second captured images, and
 when a difference between each of the intrinsic parameters measured by said calibration target measurement unit and each of the intrinsic parameters held in the holding unit does not exceed a predetermined value, said determination unit determines to calibrate the inter-device position and orientation.

5. The apparatus according to claim 2, further comprising a second measurement unit configured to measure a position and orientation of the second image capturing device based on the index detected by said second index detection unit,
 wherein said calibration target measurement unit measures relative position and orientation information based on the position and orientation of the first image capturing device measured by said position and orientation measurement unit and the position and orientation of the second image capturing device measured by said second measurement unit, and when a difference between the calculated relative position and orientation information and relative position and orientation information held in the holding unit exceeds a predetermined value, said determination unit determines to calibrate the inter-device position and orientation information.

6. The apparatus according to claim 2, further comprising a second measurement unit configured to measure a position and orientation of the second image capturing device based on the index detected by said second index detection unit, wherein said calibration target information measurement unit measures relative position and orientation information based on the position and orientation of the first image capturing device measured by said position and orientation measurement unit and the position and orientation of the second image capturing device measured by said second measurement unit, and when a difference between the calculated inter-device position and orientation information and inter-device position and orientation information held in the holding unit does not exceed a predetermined value, said determination unit determines to calibrate the intrinsic parameter of one of the first image capturing device and the second image capturing device.

7. The apparatus according to claim 1, wherein the index is a marker, and said error detection unit detects the error based on a magnitude of a deviation between a marker as the projected index and a marker as the index detected by said second index detection unit.

8. The apparatus according to claim 1, wherein each of said first index detection unit and said second index detection unit detects the index as an edge, and said error detection unit detects the error based on whether or not an edge as the projected index is parallel to an edge as the index detected by said second index detection unit.

9. The apparatus according to claim 2, wherein said calibration unit calibrates the intrinsic parameters of the first and second image capturing devices, and then calibrates the relative position and orientation information.

10. The apparatus according to claim 2, further comprising a notification unit configured to notify the error in the held relative position and orientation information to a user when the error detection unit detects the error, wherein said notification unit notifies a judgment result of said error detection unit and judges again whether or not an error is included after said calibration unit performs the calibration.

11. The apparatus according to claim 2, wherein the intrinsic parameter includes at least one of a focal length, a principal point position, and a distortion of the first or second image capturing device.

12. The apparatus according to claim 1, wherein the output unit outputs the error to a display device.

13. The apparatus according to claim 1, further comprising a notification unit configured to notify the error in the held relative position and orientation information to a user when the error detection unit detects the error.

14. The apparatus according to claim 1, further comprising a second calibration unit configured to calibrate the relative position and orientation information held in the holding unit when the error detection unit detects the error.

15. A calibration processing method by an information processing apparatus, which provides images for stereoscopic viewing by synthesizing images, obtained by capturing an image of a real space by a stereoscopic viewing apparatus that mounts both a first image capturing device and a second image capturing device, with a virtual image, the method comprising:

a first acquisition step of acquiring a first captured image obtained by capturing an index on the real space by the first image capturing device;

a first index detection step of detecting the index from the first captured image;

a position and orientation measurement step of measuring a first position and orientation of the first image capturing device based on the index detected in the first index detection step;

a holding step of holding, in a holding unit, information including at least relative position and orientation information that indicates a relative position and orientation relationship between the first capturing device and the second capturing device;

a first calculation step of calculating a position and orientation of the second image capturing device, based on the relative position and orientation information held in the holding unit, and the first position and orientation of the first image capturing device measured in the position and orientation measurement step;

a second calculation step of calculating a position of a projected index in a projection plane, by projecting the index detected from the first captured image on the projection plane based on the position and orientation of the second image capturing device calculated by the first calculation step;

a second acquisition step of acquiring a second captured image obtained by capturing an index on the real space by the second image capturing device;

a second index detection step of detecting the index from the second captured image;

an error detection step of detecting an error in the relative position and orientation information held in the holding step by comparing positions of the projected index with the index detected in the second index detection step; and an output step of outputting the error when the error is detected in the error detection step.

16. A non-transitory computer-readable storage medium storing a computer program for making a computer execute respective steps of a calibration processing method according to claim 15.

* * * * *